United States Patent
Fricke et al.

(10) Patent No.: US 10,704,180 B2
(45) Date of Patent: Jul. 7, 2020

(54) REINFORCING CAP FOR A TUB REAR WALL OF AN APPLIANCE

(71) Applicant: WHIRLPOOL CORPORATION, Benton Harbor, MI (US)

(72) Inventors: Steven Fricke, St. Joseph, MI (US); Tarun Sai Yadav Godha, St. Joseph, MI (US); James B. Hull, St. Joseph, MI (US); Peter A. Wagoner, St. Joseph, MI (US); Eric J. Walsh, St. Joseph, MI (US); Christoph J. Miller, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 161 days.

(21) Appl. No.: 15/694,003

(22) Filed: Sep. 1, 2017

(65) Prior Publication Data
US 2018/0080161 A1 Mar. 22, 2018

Related U.S. Application Data

(60) Provisional application No. 62/468,485, filed on Mar. 8, 2017, provisional application No. 62/398,075, filed on Sep. 22, 2016.

(51) Int. Cl.
D06F 37/26 (2006.01)
D06F 37/30 (2020.01)
(Continued)

(52) U.S. Cl.
CPC .......... *D06F 37/264* (2013.01); *D06F 37/267* (2013.01); *D06F 37/269* (2013.01);
(Continued)

(58) Field of Classification Search
CPC .... D06F 37/264; D06F 37/267; D06F 37/269; D06F 37/30; D06F 37/304
See application file for complete search history.

(56) References Cited

U.S. PATENT DOCUMENTS 2,394,075 A 2/1946 Kimball
3,194,032 A 7/1965 Von Brimer
(Continued)

FOREIGN PATENT DOCUMENTS

CN 1173063 2/1998
CN 202524190 11/2012
(Continued)

OTHER PUBLICATIONS

Ishak et al., "Permanent-Magnet Brushless Machines With Unequal Tooth Width and Similar Slot and Pole Numbers," IEEE Transactions on Industry Applications, vol. 41, No. 2, Mar.-Apr. 2005.

Primary Examiner — Joseph L. Perrin
(74) Attorney, Agent, or Firm — Price Heneveld LLP

(57) ABSTRACT

A laundry appliance includes a tub having a rear wall that includes a plurality of structural ribs. A drive hub has a bearing housing insert injection molded into the rear wall. A stator is attached to the drive hub at stator fastening portions exposed through the rear wall of the tub. A reinforcing cap is fixed to the structural ribs of the rear wall of the tub. The bearing housing of the drive hub extends rearwards through a portion of the reinforcing cap. The stator fastening portions are exposed through the reinforcing cap.

18 Claims, 13 Drawing Sheets

(51) Int. Cl.
    *H02K 1/14*     (2006.01)
    *H02K 1/27*     (2006.01)
    *H02K 5/02*     (2006.01)
    *H02K 5/16*     (2006.01)

(52) U.S. Cl.
    CPC ............ *D06F 37/30* (2013.01); *D06F 37/304* (2013.01); *H02K 1/146* (2013.01); *H02K 1/2786* (2013.01); *H02K 5/02* (2013.01); *H02K 5/161* (2013.01)

(56) References Cited

U.S. PATENT DOCUMENTS

| | | | |
|---|---|---|---|
| 3,223,043 A | 12/1965 | Shapiro | |
| 3,320,451 A | 5/1967 | Wiley | |
| 3,444,402 A | 5/1969 | Cartier | |
| 3,521,100 A | 7/1970 | Tamm | |
| 4,007,386 A | 2/1977 | Rustecki | |
| 4,007,387 A | 2/1977 | Rustecki | |
| 4,187,441 A | 2/1980 | Oney | |
| 4,392,072 A | 7/1983 | Rosenberry | |
| 4,392,073 A | 7/1983 | Rosenberry, Jr. | |
| 4,403,401 A | 9/1983 | Rosenberry | |
| 4,423,345 A | 12/1983 | Nilsson | |
| 4,567,391 A | 1/1986 | Tucker et al. | |
| 4,568,862 A | 2/1986 | Tassinario | |
| 4,623,812 A | 11/1986 | Van de Griend | |
| 4,644,208 A | 2/1987 | Laing | |
| 4,813,126 A | 3/1989 | Williamson | |
| 4,843,269 A | 6/1989 | Shramo | |
| 4,910,861 A | 3/1990 | Dohogne | |
| 4,930,201 A | 6/1990 | Brown | |
| 4,956,139 A | 9/1990 | Koizumi et al. | |
| 4,973,868 A | 11/1990 | Wust | |
| 4,973,872 A | 11/1990 | Dohogne | |
| 4,978,281 A | 12/1990 | Conger, IV | |
| 5,045,742 A | 9/1991 | Armstrong et al. | |
| 5,329,199 A | 7/1994 | Yockey et al. | |
| 5,528,095 A | 6/1996 | Strobl | |
| 5,578,885 A | 11/1996 | Alford et al. | |
| 5,672,405 A | 9/1997 | Plank, Jr. et al. | |
| 5,818,144 A | 10/1998 | Kim | |
| 5,866,964 A | 2/1999 | Li | |
| 5,907,206 A | 5/1999 | Shiga et al. | |
| 6,127,760 A | 10/2000 | Nagasaki et al. | |
| 6,144,131 A | 11/2000 | Hollenbeck et al. | |
| 6,148,647 A | 11/2000 | Kabeya et al. | |
| 6,175,177 B1 | 1/2001 | Sabinski et al. | |
| 6,257,027 B1 | 7/2001 | Imai | |
| 6,285,104 B1 | 9/2001 | Nashiki | |
| 6,370,761 B2 | 4/2002 | Shiga et al. | |
| 6,396,177 B1 | 5/2002 | Shin et al. | |
| 6,445,105 B1 | 9/2002 | Kliman et al. | |
| 6,460,382 B1 | 10/2002 | Kim et al. | |
| 6,477,869 B2 | 11/2002 | Heyder et al. | |
| 6,504,283 B1 | 1/2003 | Asao et al. | |
| 6,510,716 B1 | 1/2003 | Kim et al. | |
| 6,511,232 B1 | 1/2003 | Ishii et al. | |
| 6,564,594 B1 * | 5/2003 | Ito ............................ | D06F 23/06 68/140 |
| 6,664,703 B2 | 12/2003 | Oketani et al. | |
| 6,729,011 B2 | 5/2004 | Asao et al. | |
| 6,744,157 B2 | 6/2004 | Choi et al. | |
| 6,849,982 B2 | 2/2005 | Haydock et al. | |
| 6,880,229 B2 | 4/2005 | Zepp et al. | |
| 6,892,439 B1 | 5/2005 | Neal et al. | |
| 6,929,575 B2 | 8/2005 | Takahashi et al. | |
| 6,992,419 B2 | 1/2006 | Kim et al. | |
| 7,015,606 B2 | 3/2006 | Huang et al. | |
| 7,114,355 B2 | 10/2006 | Kim et al. | |
| 7,141,905 B2 | 11/2006 | Vollmer | |
| RE39,416 E | 12/2006 | Shin et al. | |
| 7,196,446 B2 | 3/2007 | Hans | |
| 7,200,917 B2 | 4/2007 | Takano et al. | |
| 7,247,967 B2 | 7/2007 | Ionel et al. | |
| 7,356,906 B2 | 4/2008 | Kim et al. | |
| 7,380,424 B2 | 6/2008 | Kim et al. | |
| 7,397,158 B2 | 7/2008 | Lee et al. | |
| 7,415,849 B2 | 8/2008 | Kim et al. | |
| 7,441,421 B2 | 10/2008 | Kim et al. | |
| 7,443,074 B2 | 10/2008 | Kim et al. | |
| 7,449,137 B2 | 11/2008 | Staargaard et al. | |
| 7,520,148 B2 | 4/2009 | Choi | |
| 7,569,633 B2 | 8/2009 | Koizumi | |
| 7,640,771 B2 | 1/2010 | Fechtel et al. | |
| 7,692,342 B2 | 4/2010 | Ahn | |
| 7,698,803 B2 | 4/2010 | Mitsui et al. | |
| 7,750,531 B2 * | 7/2010 | Kim ........................ | H02K 1/30 310/268 |
| 7,755,228 B2 | 7/2010 | Kim et al. | |
| 7,997,103 B2 | 8/2011 | Kim et al. | |
| 8,011,211 B2 | 9/2011 | Ahn | |
| 8,030,808 B2 | 10/2011 | Zhang | |
| 8,080,907 B2 | 12/2011 | Jeung | |
| 8,179,016 B2 | 5/2012 | Asano | |
| 8,191,389 B2 | 6/2012 | Kim et al. | |
| 8,220,295 B2 | 7/2012 | Choi et al. | |
| 8,344,568 B2 | 1/2013 | Bailey et al. | |
| 8,344,584 B2 | 1/2013 | Ahn et al. | |
| 8,353,216 B2 | 1/2013 | Giordano et al. | |
| 8,358,045 B2 | 1/2013 | Van Heyden et al. | |
| 8,395,293 B2 | 3/2013 | Marchitto | |
| 8,461,739 B2 | 6/2013 | Liang et al. | |
| 8,482,176 B2 | 7/2013 | Bailey et al. | |
| 8,539,665 B2 | 9/2013 | Dokonal et al. | |
| 8,552,601 B2 | 10/2013 | Mizukami et al. | |
| 8,567,043 B2 | 10/2013 | Horst et al. | |
| 8,578,741 B2 | 11/2013 | Gillo et al. | |
| 8,621,896 B2 | 1/2014 | Kim et al. | |
| 8,677,789 B2 | 3/2014 | Gracia Bobed et al. | |
| 8,716,912 B2 | 5/2014 | Bailey et al. | |
| 8,749,111 B2 | 6/2014 | Lee | |
| 8,978,425 B2 | 3/2015 | Lee | |
| 8,987,955 B2 | 3/2015 | Mizukami et al. | |
| 8,997,533 B2 | 4/2015 | Kim et al. | |
| 9,054,571 B2 | 6/2015 | Dokonal et al. | |
| 9,071,090 B2 | 6/2015 | Watanabe et al. | |
| 9,080,279 B2 | 7/2015 | Jun et al. | |
| 9,085,846 B2 | 7/2015 | Garlatti | |
| 9,130,441 B2 | 9/2015 | Okada | |
| 9,206,540 B2 | 12/2015 | Lim et al. | |
| 9,212,445 B2 | 12/2015 | Erickson | |
| 9,312,743 B2 | 4/2016 | Kim et al. | |
| 9,328,447 B2 | 5/2016 | Kim et al. | |
| 9,376,767 B2 | 6/2016 | Quandt et al. | |
| 9,392,925 B2 | 7/2016 | Kim | |
| 9,401,631 B2 | 7/2016 | Wu et al. | |
| 9,472,997 B2 | 10/2016 | Figgins et al. | |
| 9,479,022 B2 | 10/2016 | Hoemann et al. | |
| 9,493,899 B2 | 11/2016 | Lee | |
| 9,545,467 B2 | 1/2017 | Wampler et al. | |
| 9,577,554 B2 | 2/2017 | Kim et al. | |
| 9,644,304 B2 | 5/2017 | Kim et al. | |
| 9,673,678 B2 | 6/2017 | Okada et al. | |
| 9,800,116 B2 | 10/2017 | Iwai et al. | |
| 9,800,117 B2 | 10/2017 | Iwai | |
| 9,896,794 B2 | 2/2018 | Kim | |
| 9,923,493 B2 | 3/2018 | Matsuoka et al. | |
| 9,976,243 B2 | 5/2018 | Kim et al. | |
| 9,988,752 B2 | 6/2018 | Kim et al. | |
| 2003/0214198 A1 | 11/2003 | Harada et al. | |
| 2005/0034491 A1 | 2/2005 | Tazawa et al. | |
| 2005/0073210 A1 | 4/2005 | Rocky et al. | |
| 2006/0042022 A1 | 3/2006 | Kim et al. | |
| 2006/0076845 A1 | 4/2006 | Park et al. | |
| 2006/0119204 A1 | 6/2006 | Awazu et al. | |
| 2007/0068199 A1 | 3/2007 | Dahlmann et al. | |
| 2007/0132323 A1 | 6/2007 | Park | |
| 2007/0138902 A1 | 6/2007 | Ahn et al. | |
| 2007/0138904 A1 | 6/2007 | Chae | |
| 2007/0289341 A1 | 12/2007 | Hollenhorst et al. | |
| 2008/0024019 A1 | 1/2008 | Sakuma et al. | |
| 2009/0085422 A1 | 4/2009 | Kusawake et al. | |

(56) References Cited

U.S. PATENT DOCUMENTS

| | | | |
|---|---|---|---|
| 2009/0100879 A1* | 4/2009 | Kim | D06F 37/206 |
| | | | 68/140 |
| 2009/0193855 A1 | 8/2009 | Park et al. | |
| 2009/0211310 A1* | 8/2009 | Kim | D06F 37/206 |
| | | | 68/23.1 |
| 2010/0141079 A1 | 6/2010 | Chu et al. | |
| 2010/0206015 A1 | 8/2010 | Mancini et al. | |
| 2010/0287995 A1 | 11/2010 | Mancini et al. | |
| 2011/0001400 A1 | 1/2011 | Chiba et al. | |
| 2011/0121668 A1 | 5/2011 | Condamin et al. | |
| 2011/0135239 A1* | 6/2011 | Eo | B22D 17/24 |
| | | | 384/584 |
| 2012/0006070 A1 | 1/2012 | Song et al. | |
| 2012/0007481 A1 | 1/2012 | Filippetti et al. | |
| 2013/0009513 A1 | 1/2013 | Jang et al. | |
| 2013/0014545 A1 | 1/2013 | Ushijima et al. | |
| 2013/0049512 A1 | 2/2013 | Jung | |
| 2013/0055771 A1 | 3/2013 | Tashiro et al. | |
| 2013/0106237 A1 | 5/2013 | Jang et al. | |
| 2013/0214637 A1 | 8/2013 | Hill et al. | |
| 2013/0327098 A1 | 12/2013 | Bae et al. | |
| 2014/0084734 A1 | 3/2014 | Ishigami et al. | |
| 2014/0125189 A1 | 5/2014 | Hoemann | |
| 2014/0139067 A1 | 5/2014 | Neuenschwander et al. | |
| 2014/0167531 A1 | 6/2014 | Hangmann | |
| 2014/0175912 A1 | 6/2014 | Germann et al. | |
| 2014/0232214 A1 | 8/2014 | Bailey et al. | |
| 2015/0008769 A1 | 1/2015 | Uchitani | |
| 2015/0033802 A1 | 2/2015 | Kleinmanns et al. | |
| 2015/0076954 A1 | 3/2015 | Johnson et al. | |
| 2015/0076955 A1 | 3/2015 | Hoemann | |
| 2015/0207371 A1 | 7/2015 | Duncan et al. | |
| 2015/0252507 A1 | 9/2015 | Kim et al. | |
| 2015/0256056 A1 | 9/2015 | Kim et al. | |
| 2015/0318744 A1 | 11/2015 | Ekin et al. | |
| 2015/0368849 A1 | 12/2015 | Pessot et al. | |
| 2016/0130739 A1 | 5/2016 | Song | |
| 2016/0160961 A1 | 6/2016 | Biro et al. | |
| 2016/0197524 A1 | 7/2016 | Bastien | |
| 2016/0201246 A1 | 7/2016 | Song et al. | |
| 2016/0215436 A1 | 7/2016 | Gasparini | |
| 2016/0238011 A1 | 8/2016 | Lambert et al. | |
| 2016/0241105 A1 | 8/2016 | Moore et al. | |
| 2016/0244905 A1 | 8/2016 | Lv et al. | |
| 2016/0245580 A1 | 8/2016 | Brownlow | |
| 2016/0348295 A1 | 12/2016 | Bae et al. | |
| 2016/0376741 A1 | 12/2016 | Kim et al. | |
| 2017/0008403 A1 | 1/2017 | Yazdanpanah et al. | |
| 2017/0044705 A1 | 2/2017 | Kim et al. | |
| 2017/0122646 A1 | 5/2017 | Kuehl et al. | |
| 2017/0179775 A1 | 6/2017 | Kim et al. | |
| 2017/0191203 A1 | 7/2017 | Kim et al. | |
| 2017/0204551 A1 | 7/2017 | Kim et al. | |
| 2017/0268150 A1 | 9/2017 | Lv et al. | |
| 2018/0030638 A1 | 2/2018 | Nakagawa et al. | |

FOREIGN PATENT DOCUMENTS

| | | |
|---|---|---|
| DE | 9215811 | 2/1993 |
| EP | 1116812 | 7/2001 |
| EP | 1431439 | 6/2004 |
| EP | 2159314 | 3/2010 |
| EP | 3316458 | 5/2018 |
| GB | 2189511 | 10/1987 |
| JP | 59110347 | 6/1984 |
| JP | 23447599 | 2/2001 |
| JP | 2007104795 | 4/2007 |
| WO | 200122560 | 3/2001 |
| WO | 2006001639 | 1/2006 |
| WO | 2006052073 | 5/2006 |
| WO | 2006054842 | 5/2006 |
| WO | 2006064860 | 6/2006 |
| WO | 2007108588 | 9/2007 |
| WO | 2007129352 | 11/2007 |
| WO | 2007132955 | 11/2007 |
| WO | 2009017430 | 2/2009 |
| WO | 2009040302 | 4/2009 |
| WO | 2011141958 | 11/2011 |
| WO | 2014114942 | 7/2014 |

* cited by examiner

REINFORCING CAP FOR A TUB REAR WALL OF AN APPLIANCE

CROSS-REFERENCE TO RELATED APPLICATIONS

This application claims priority to and the benefit under 35 U.S.C. § 119(e) of U.S. Provisional Patent Application No. 62/398,075, filed on Sep. 22, 2016, entitled "REINFORCING CAP FOR A TUB REAR WALL OF AN APPLIANCE," and to U.S. Provisional Patent Application No. 62/468,485, entitled "REINFORCING CAP FOR A TUB REAR WALL OF AN APPLIANCE," the entire disclosures of which are hereby incorporated herein by reference.

FIELD OF THE DEVICE

This device is in the field of laundry appliances, more specifically, a reinforcing cap placed upon a rear wall of a tub for a laundry appliance.

SUMMARY

In at least one aspect, a laundry appliance includes a tub having a rear wall that includes a plurality of structural ribs. A drive hub has a bearing housing insert injection molded into the rear wall. A stator is attached to the drive hub at stator fastening portions exposed through the rear wall of the tub. A reinforcing cap is fixed to the structural ribs of the rear wall of the tub. The bearing housing of the drive hub extends rearwards through a portion of the reinforcing cap. The stator fastening portions are exposed through the reinforcing cap.

In at least another aspect, a tub for a laundry appliance includes a rear wall having structural ribs that define a back surface of the rear wall. A reinforcing cap is fixed to the back surface of the rear wall. A drive hub is insert injection molded into the rear wall. A stator fastening portion of the drive hub extends through an opening of the reinforcing cap. The reinforcing cap is separated from the drive hub.

In at least another aspect, a tub for a laundry appliance includes a rear wall that includes a plurality of structural ribs that extend to a back surface of the tub. A reinforcing cap has a reinforcing portion that is attached to the rear surface and a frustoconical portion that is at least partially separated from the rear surface. A drive hub is insert injection molded into the rear wall. A stator fastening portion of the drive hub extends through a portion of the reinforcing cap. The reinforcing cap is separated from the drive hub.

These and other features, advantages, and objects of the present device will be further understood and appreciated by those skilled in the art upon studying the following specification, claims, and appended drawings.

DETAILED DESCRIPTION OF EMBODIMENTS

Figure 1:
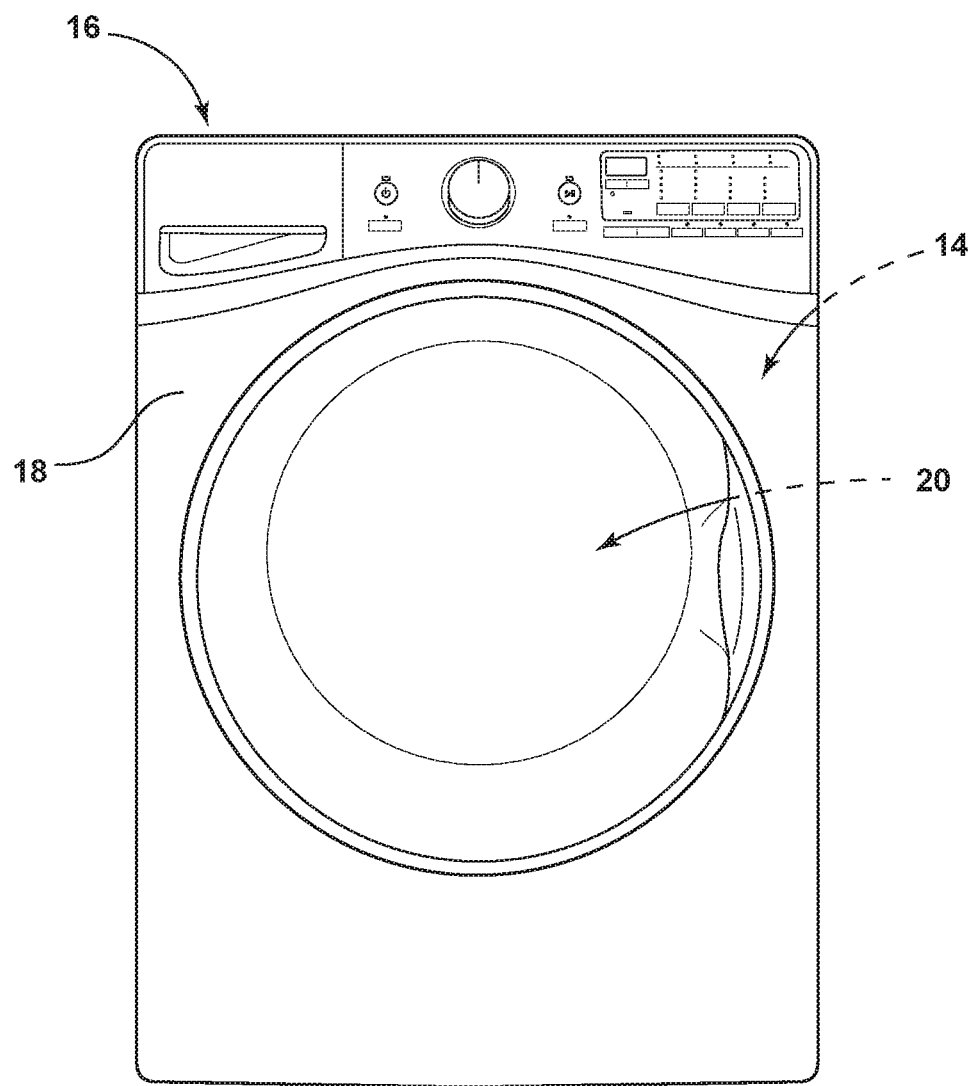
FIG. 1 is a front elevational view of a laundry appliance incorporating an aspect of the reinforcing cap attached to a rear wall of the tub for the appliance.
Figure 2:
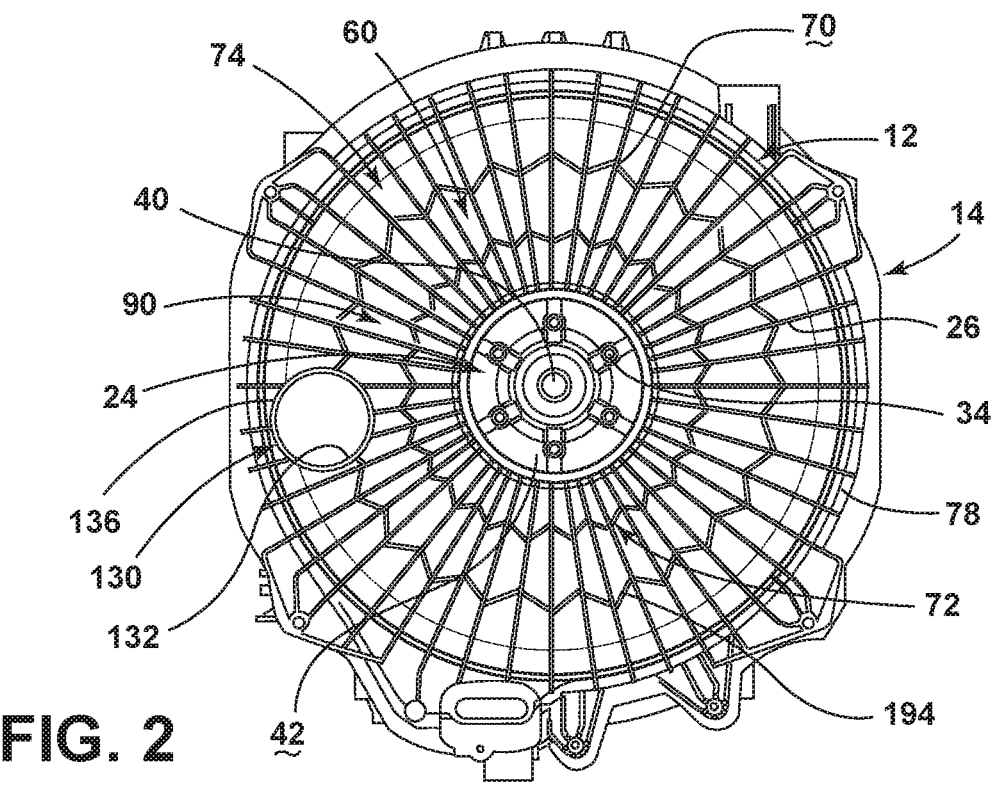
FIG. 2 is a rear elevational view of a rear wall of a tub for a laundry appliance with the reinforcing cap removed and the support ribs exposed.
Figure 3:
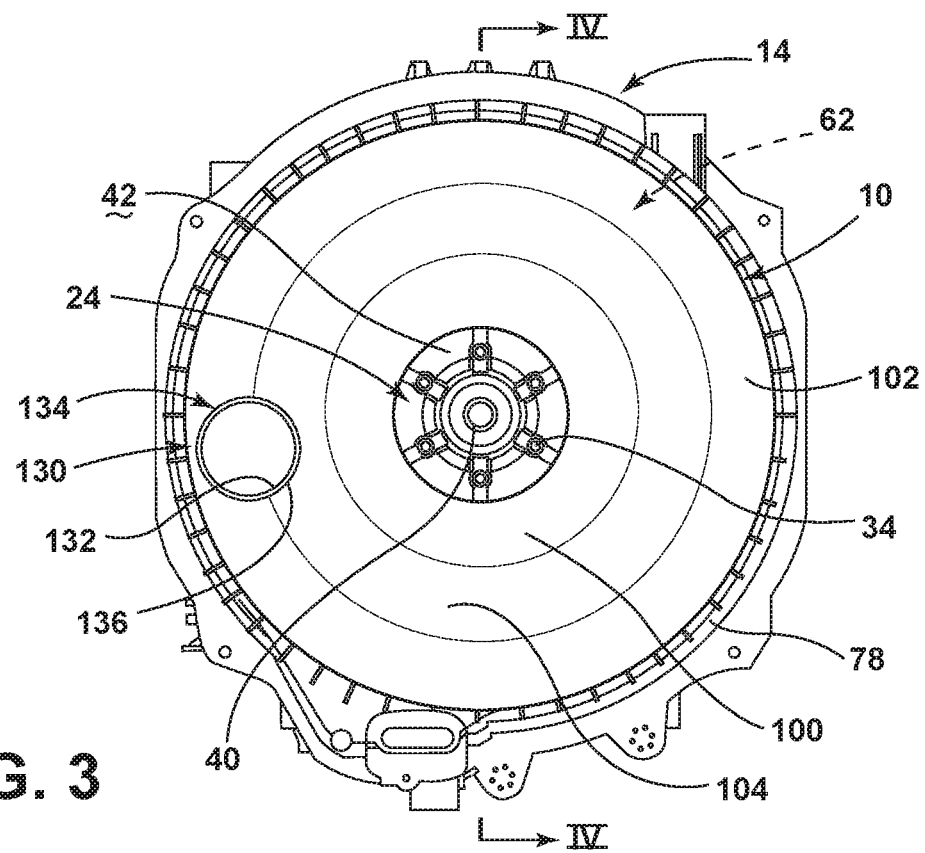
FIG. 3 is a rear elevational view of the tub of FIG. 2 with the reinforcing cap attached to the support ribs.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-5, reference numeral 10 generally refers to a reinforcing cap attached to a rear wall 12 of a tub 14 for an appliance 16, such as a laundry appliance. The laundry appliance 16 can include the tub 14 within the appliance cabinet 18 and a drum 20 rotationally mounted within the tub 14. According to the various embodiments, the laundry appliance 16 can include the tub 14 having a rear wall 12. A hub 24, such as a drive hub, is insert injection-molded within the rear wall 12 of the tub 14. It is contemplated that the rear wall 12 can include a plurality of structural support ribs 26 that extend outward from a portion of the tub 14. An electrical direct drive motor 28 having a stator 30 and a rotor 32 extending around the stator 30 is attached to the hub 24, where the stator 30 of the motor 28 is attached to stator fastening portions 34 that are integrally formed within the hub 24. The rotor 32 is attached to a shaft 36 that extends through bearings 38 disposed within a bearing housing 40 of the hub 24 and extend to the drum 20 such that rotation of the rotor 32 results in a simultaneous rotation of the drum 20 within the tub 14. A reinforcing cap 10 is attached to the rear wall 12 of the tub 14. The reinforcing cap 10 is positioned on the rear wall 12 and is separated from both the hub 24 and the motor 28. Specifically, the reinforcing cap 10 is positioned between the stator 30 of the motor 28 and an exposed outer surface 42 of the hub 24.

Figure 4:
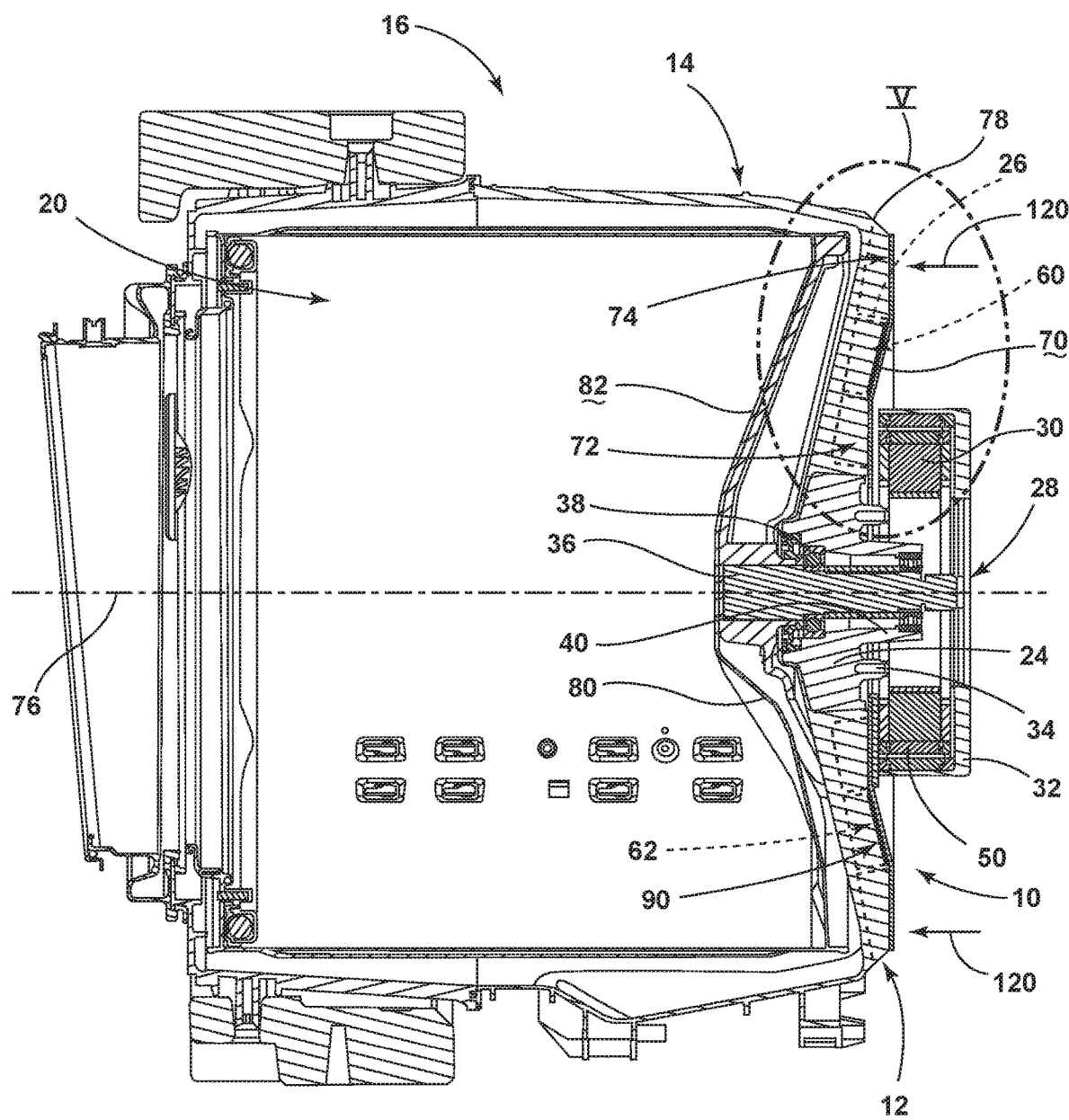
FIG. 4 is a cross-sectional view of the tub of FIG. 3, taken along line IV-IV.
Figure 5:
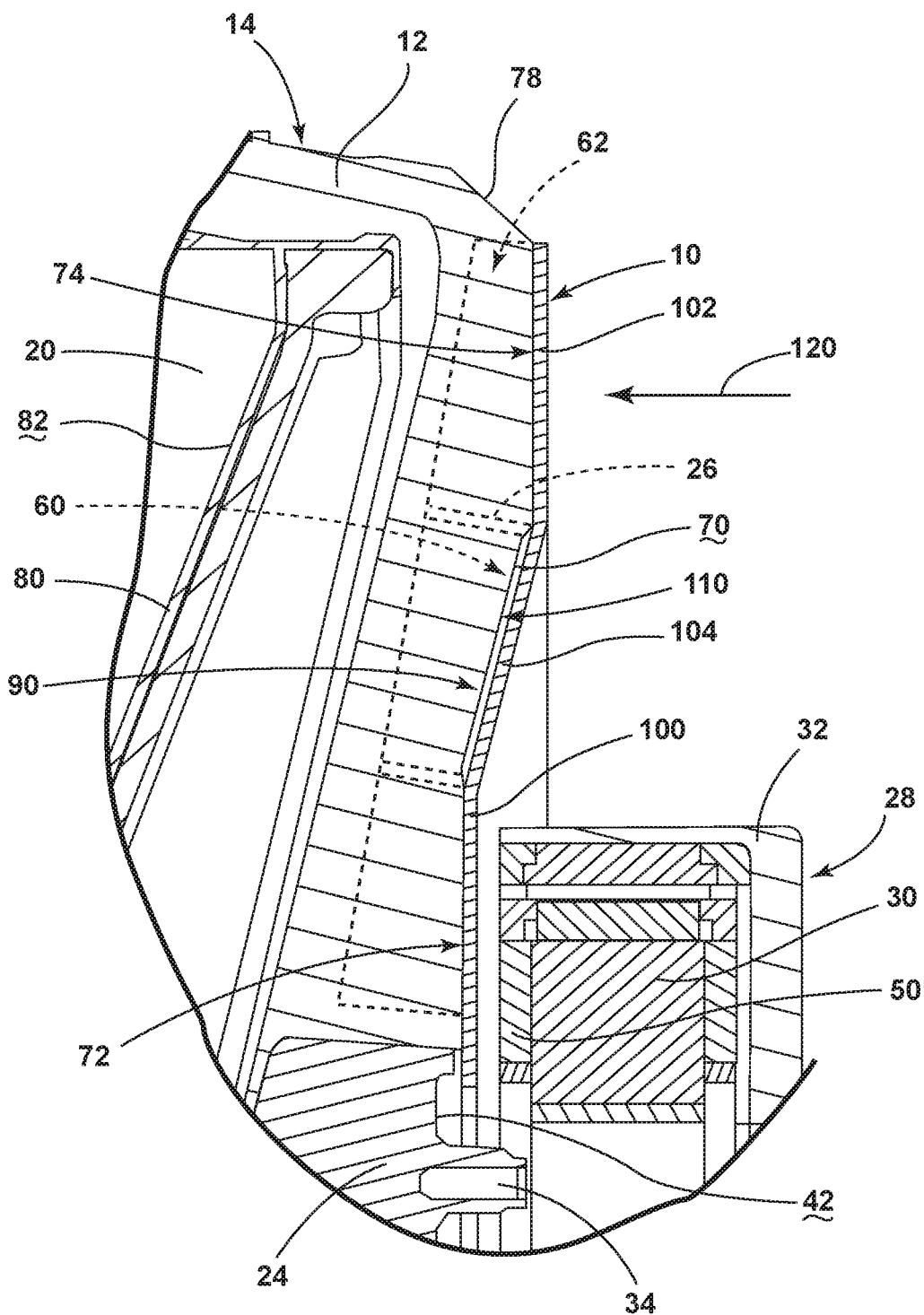
FIG. 5 is an enlarged cross-sectional view of the tub of FIG. 4 taken at area V.
Figure 6:
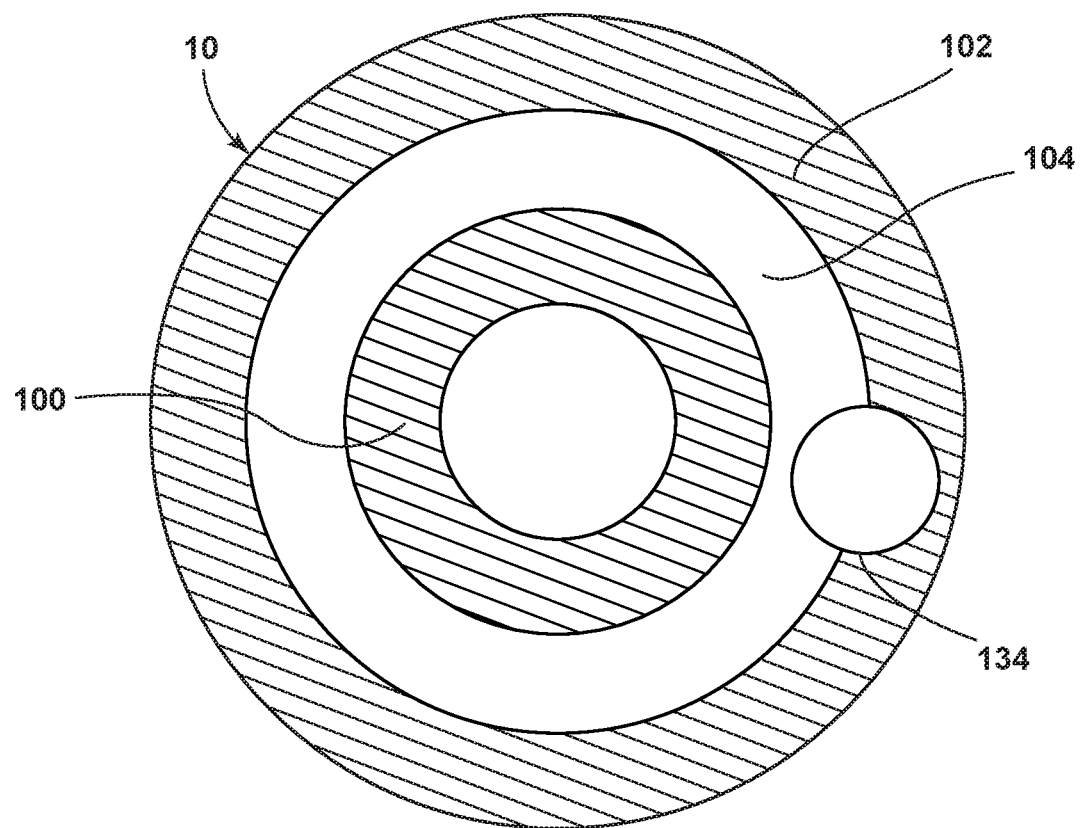
FIG. 6 is a schematic elevational view of an aspect of the reinforcing cap and exemplifying attachment portions of the reinforcing cap.

Referring now to FIGS. 4 and 5, it is contemplated that the reinforcing cap 10 can be positioned between an outer surface 42 of the hub 24 and the stator 30 to prevent inadvertent collision between portions of the motor 28 and the hub 24, which is typically made of metal, such as steel and/or aluminum. It has been found that certain portions of the motor 28, such as windings 50 of the stator 30, may come free during use of the appliance 16 and engage portions of the metallic hub 24. This engagement between portions of the motor 28 and the metallic hub 24 may result in a short circuit of the motor 28 and potentially damage to the appliance 16. Positioning of the reinforcing cap 10 between the motor 28 and the metallic hub 24 substantially prevents such unwanted engagement of components and diminishes the potential for a short circuit event during use of the appliance 16. In order to properly insulate the metallic hub 24 from inadvertent contact from portions of the motor 28, the reinforcing cap 10 is typically made of plastic. It is contemplated that alternative embodiments of the device can include a metallic reinforcing cap 10. In such alternative embodiments, the reinforcing cap 10 is typically used only for reinforcement of the rear wall 12 of the tub 14, although insulating functions are contemplated as well.

Referring again to FIGS. 2-6, the plurality of support ribs 26 defined within the rear wall 12 of the tub 14 form a pattern within the rear wall 12 of the tub 14 that defines a plurality of support cavities 60 therein. When the reinforcing cap 10 is attached to the rear wall 12 of the tub 14, the reinforcing cap 10 directly engages at least a portion of the support ribs 26 to enclose a portion of the support cavities 60 to form at least one enclosed support cavity 60. The cooperation of the reinforcing cap 10 and the support ribs 26 attached to the reinforcing cap 10 creates a plurality of shear walls 62 that are formed by the reinforcing cap 10 enclosing a portion of the support cavities 60 defined by the support ribs 26 of the rear wall 12 of the tub 14.

As discussed above, and as exemplified in FIGS. 2-6, the reinforcing cap 10 is typically made of plastic. According to the various embodiments, the reinforcing cap 10 can be made of various polymers, non-magnetic metals, other types of metals, carbon fiber-type materials, combinations thereof, and other similar reinforcing materials. By way of example, and not limitation, the reinforcing cap 10 may be made of 30% glass filled polypropylene. The rear wall 12 of the tub 14 may be made of a similar material to that of the reinforcing cap 10. It is also contemplated that the rear wall 12 of the tub 14 can be made of a more economical grade plastic, such that use of the reinforcing cap 10 adds structural integrity to the rear wall 12 of the tub 14, while efficiently reinforcing the rear wall 12 of the tub 14 with discreet placement of more robust reinforcing materials found in the reinforcing cap 10.

It is contemplated that the reinforcing cap 10 can be attached to the rear wall 12 of the tub 14 through various methods and mechanisms. Typically, the reinforcing cap 10 can be attached to the rear wall 12 of the tub 14 through welding methods that can include, but are not limited to, heat welding, sonic welding, vibration-friction welding, and other similar welding methods. It is also contemplated that the reinforcing cap 10 can be attached to the rear wall 12 of the tub 14 through fasteners that mechanically secure the reinforcing cap 10 to the rear wall 12 of the tub 14. Combinations of fasteners and welding methods can also be used in conjunction to attach the reinforcing cap 10 to the rear wall 12 of the tub 14.

As exemplified in FIGS. 2-6, the rear wall 12 of the tub 14 can include a plurality of support portions that form a contoured shape that is defined by the back surface 70 of the rear wall 12 of the tub 14, i.e., the back surface 70 of the support ribs 26 of the rear wall 12. In this manner, the rear wall 12 can include inner and outer support portions 72, 74 that are oriented substantially perpendicular to a central axis 76 of the tub 14. It is contemplated that the inner support portion 72 can be positioned immediately adjacent to the exposed outer surface 42 of the hub 24 that include the bearing housing 40 and the stator fastening portions 34. The outer support portion 74 of the rear wall 12 can be positioned proximate an outer circumference 78 of the rear wall 12 of the tub 14. It is contemplated that the inner and outer support portions 72, 74 occupy different planes that are each perpendicular to the central axis 76 of the tub 14. Accordingly, the inner and outer support portions 72, 74 form a stepped configuration of the rear wall 12 of the tub 14 that generally follows a curvature 80 of the inner surface 82 of the rear wall 12 of the tub 14. In this manner, the outer support portion 74 is positioned rearward of the inner support portion 72.

Referring again to FIGS. 2-6, to connect the inner and outer support portions 72, 74, the rear wall 12 can include an angled support portion 90 that extends between the inner and outer support portions 72, 74. The angled support portion 90 extends outwardly between the inner and outer support portions 72, 74. In such an embodiment, the inner, outer and angled support portions 72, 74, 90 are each concentric with the central axis 76 of the tub 14. While the illustrated embodiments include only one angled support portion 90, it is contemplated that embodiments of the rear wall 12 of the tub 14 can include multiple support portions, similar to the inner and outer support portions 72, 74 that are each defined within different but parallel vertical planes that are substantially perpendicular to the central axis 76 of the tub 14. Each of these parallel planes can be attached by separate and dedicated angled support portions 90 that extend between these substantially vertical and parallel support portions.

Referring again to FIGS. 2-6, in order to match the configuration of the rear wall 12 of the tub 14 that includes the inner, outer and angled support portions 72, 74, 90, the reinforcing cap 10 can include inner, outer and angled reinforcing portions 100, 102, 104 that substantially align with the inner, outer and angled support portions 72, 74, 90 of the rear wall 12 of the tub 14, respectively. Accordingly, the inner reinforcing portion 100 of the reinforcing cap 10 is adapted to engage the inner support portion 72 of the rear wall 12 of the tub 14. Similarly, the outer reinforcing portion 102 of the reinforcing cap 10 is adapted to engage the outer support portion 74 of the rear wall 12 of the tub 14. The angled reinforcing portion 104 of the reinforcing cap 10 can, in certain embodiments, engage the angled support portion 90 of the rear wall 12 of the tub 14. Alternatively, the angled reinforcing portion 104 of the reinforcing cap 10 may be spaced apart from the angled support portion 90 of the rear wall 12 of the tub 14 to define a clearance space 110 between the reinforcing cap 10 and the rear wall 12 of the tub 14. This clearance space 110 can account for dimensional tolerances and imperfections within the reinforcing cap 10 and the rear wall 12 of the tub 14 that may be present during manufacture of the appliance 16. The clearance space 110 can serve to provide room for these dimensional tolerances and imperfections. Accordingly, the main connecting portions between the reinforcing cap 10 and the rear wall 12 of the tub 14 are typically at the areas of engagement between the inner support portion 72 and the inner reinforcing portion 100 and between the outer support portion 74 and the outer reinforcing portion 102.

During testing of the appliance 16, it has been found that attachment between the angled support portion 90 of the rear wall 12 of the tub 14 and the angled reinforcing portion 104 of the reinforcing cap 10 may provide minimal additional reinforcing support. Additionally, during performance of certain welding methods for attaching the reinforcing cap 10 to the rear wall 12 of the tub 14, pressure typically needs to be applied to the reinforcing cap 10 against the rear wall 12 of the tub 14. This pressure is more efficiently applied perpendicularly, such as through the inner and outer reinforcing portions 100, 102. As discussed above, the inner and outer reinforcing portions 100, 102 are substantially perpendicular to the central axis 76 of the tub 14 such that force 120 can be applied perpendicularly in these locations for more efficient welding between the reinforcing cap 10 and the rear wall 12 of the tub 14. Because the angled reinforcing portion 104 of the reinforcing cap 10 is generally in the shape of a truncated cone, the perpendicular application of force 120 during welding may be less practical and more inefficient within these angled support and reinforcing portions 90, 104.

Referring again to FIGS. 2-6, the tub 14 can include certain apertures 130 and utility attachment points for receiving various mechanical features of the appliance 16. By way of example, and not limitation, the rear wall 12 of the tub 14 may include a duct opening 132 for receiving a heated combo system (not shown), where the appliance 16 may include both washing and drying functions. This duct opening 132 is defined within the rear wall 12 of the tub 14. Accordingly, the reinforcing cap 10 includes a similar cap opening 134 that further defines the duct opening 132 through which the heated combo system can be disposed. The rear wall 12 of the tub 14 can also include a duct wall 136 that extends outward from the rear wall 12 of the tub 14 and engages a portion of the reinforcing cap 10 at a cap opening 134 defined within the reinforcing cap 10. It is also contemplated that the reinforcing cap 10 can include additional openings and connection points for accommodating space for wire harnesses, duct work, piping and other similar utility fixtures 160 of the appliance 16. The duct wall 136 that extends outward from the tub 14 can be used in conjunction with the cap opening 134 to further define the shear walls 62 that are defined between the reinforcing cap 10 and the support ribs 26 of the rear wall 12 of the tub 14. Accordingly, the various cap openings 134 that extend through the reinforcing cap 10 can define portions of the structure defined between the reinforcing cap 10 and the rear wall 12 of the tub 14. These cap openings 134 also allow for the passage of utilities 186 into and from the tub 14.

Referring again to FIGS. 2-6, it is contemplated that the use of the reinforcing cap 10 provides added structure to the rear wall 12 of the tub 14 for receiving rotational forces exerted upon the hub 24 and the drum 20 through rotation of the rotor 32 around the stator 30 and also the drum 20 within the tub 14. Definition of the various shear walls 62 defined between the reinforcing ribs of the rear wall 12 of the tub 14 and reinforcing cap 10 serve to resist deflection during operation of the appliance 16 and create a generally stronger rear wall 12 of the tub 14.

According to the various embodiments, it is contemplated that the reinforcing cap 10 can be a substantially planar member that extends outward from proximate the hub 24 that is insert molded within the rear wall 12 of the tub 14. Additionally, the reinforcing cap 10 can include a generally conical or frustoconical shape that extends outward from the hub 24 disposed at least partially in the rear wall 12 of the tub 14. In such an embodiment, the generally conical or frustoconical shape of the reinforcing cap 10 may be interspersed with planar reinforcing portions or planar rings that are similar to the inner and outer reinforcing portions 100, 102. These reinforcing portions typically extend concentrically and perpendicularly outward from the central axis 76 of the tub 14. The generally planar reinforcing portions of the conical or frustoconical reinforcing cap 10 can also be intermittently spaced throughout the reinforcing cap 10 to define various reinforcing portions of the reinforcing cap 10, similar to the inner and outer reinforcing portions 100, 102. Within these reinforcing portions, the reinforcing cap 10 can define one or more shear walls 62 with the support ribs 26 defined within the rear wall 12 of the tub 14. The plurality of reinforcing portions are typically configured to be substantially perpendicular to the central axis 76 of the tub 14. Accordingly, sufficient pressure can be efficiently applied to these reinforcing portions in a perpendicular direction and against support portions of the rear wall 12 of the tub 14 to accomplish the various welding functions for attaching the reinforcing cap 10 to the rear wall 12 of the tub 14. These reinforcing portions 104 can be regularly placed, placed in a concentric pattern, placed in a radial pattern, placed in an irregular pattern that accommodates various utilities 186 of the appliance 16, or other similar pattern.

According to the various embodiments, as exemplified in FIGS. 1-5, the reinforcing cap 10 is installed within an appliance 16 having a tub 14 that is positioned along a horizontal axis. It is contemplated that the reinforcing cap 10 is not limited to this particular appliance 16 configuration. It should be understood that the reinforcing cap 10 can be incorporated into various appliances 16 and appliance 16 configurations. These appliances 16 can include, but are not limited to, horizontal axis appliances, vertical axis appliances, angular axis machines, direct drive machines, machines having a belt-drive motor 140 (shown in FIG. 10), and other similar appliance 16 types and configurations.

Figure 7:
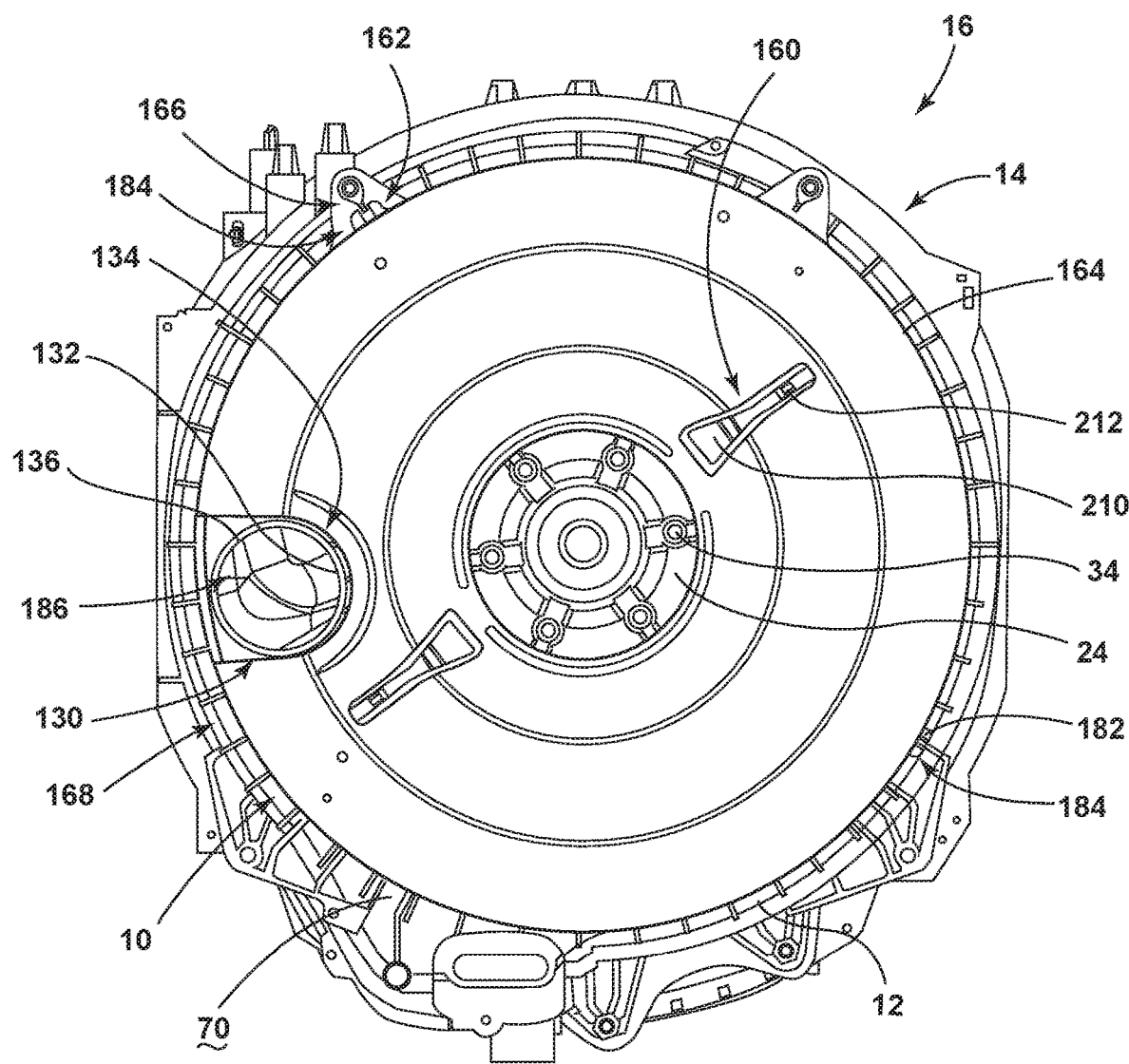
FIG. 7 is a rear elevational view of a rear wall of a tub for a laundry appliance incorporating an aspect of a reinforcing cap.
Figure 8:
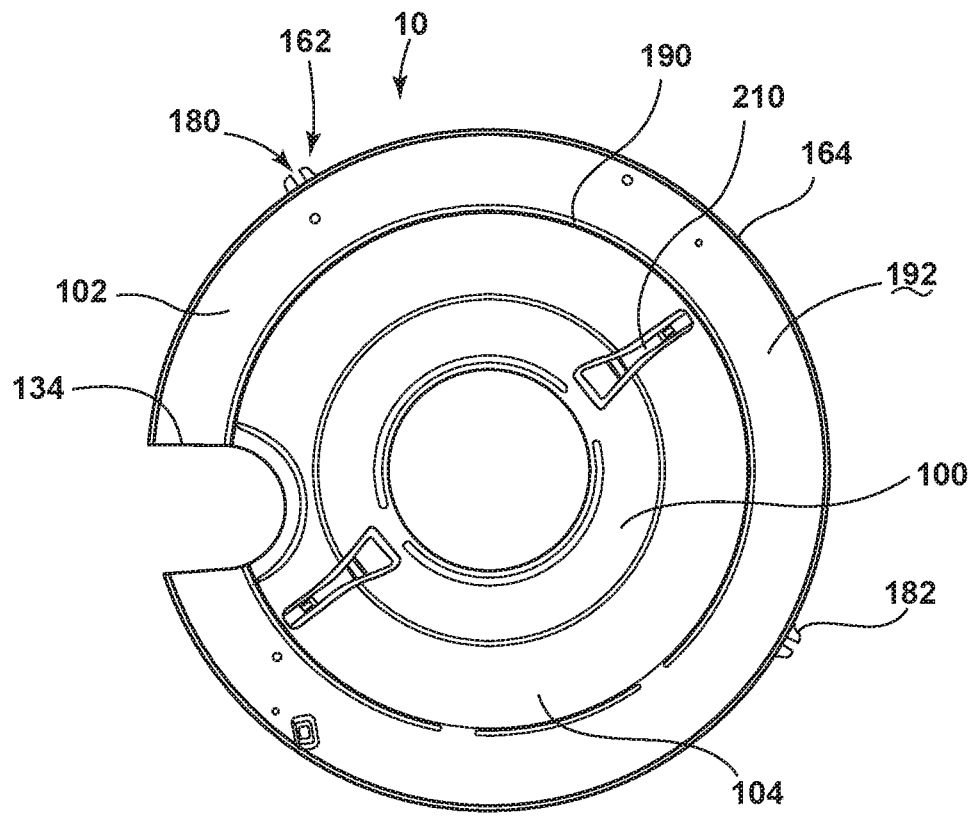
FIG. 8 is an elevational view of an engaging side of an aspect of a reinforcing cap for a back wall of an appliance.
Figure 9:
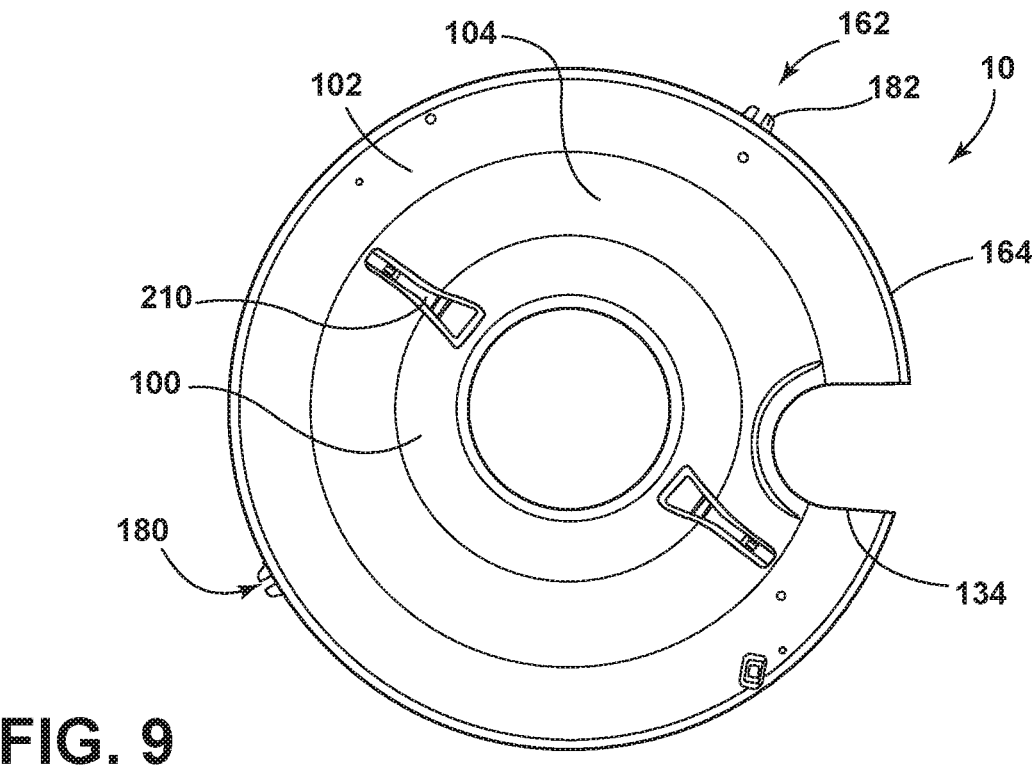
FIG. 9 is an elevational view of an exposed surface of the reinforcing cap of FIG. 8.

As exemplified in FIGS. 7-9, the reinforcing cap 10 is typically attached to a back surface 70 of the rear wall 12. The reinforcing cap 10 can be welded, adhered, or otherwise attached to the support ribs 26 of the rear wall 12 of the tub 14. In order to properly align the reinforcing cap 10 and the various utility fixtures 160 that are defined within the reinforcing cap 10, the reinforcing cap 10 can include one or more integral alignment features 162. These integral alignment features 162 can typically extend outward from a perimeter 164 of a reinforcing cap 10 to engage alignment receptacles 166 that are defined within the rear wall 12 of the tub 14. During installation of the reinforcing cap 10, the integral alignment features 162 engage and are at least partially secured within the alignment receptacles 166, typically, without welding. When the integral alignment features 162 are secured within the alignment receptacles 166, the reinforcing cap 10 is engaged at least minimally with and is retained against the rear wall 12 of the tub 14. This engagement is without tools or fasteners and is also without the aid of additional individuals. In this manner, the welding, adhering, or other similar attachment process can take place without the assistance of additional workers. The engagement between the alignment features 162 and the alignment receptacles 166 is temporary and is sufficiently robust to allow for performance of the welding operations to secure the reinforcing cap 10 to the rear wall 12. Accordingly, the reinforcing cap 10 can be maintained in a predetermined angular position 168 with respect to the rear wall 12 of the tub 14 and can be secured in this predetermined angular position 168 in a permanently fixed and secured manner. The use of the alignment features 162 in conjunction with the alignment receptacles 166 serves to make the process of attaching or securing the reinforcing cap 10 to the tub 14 a faster and more efficient process. Additionally, the use of external tools or fasteners for temporarily securing the reinforcing cap 10 before and during welding can be largely or completely eliminated.

Referring again to FIGS. 7-9, the integral alignment features 162 can extend outward and can define a retaining region 180 between two opposing retaining tabs 182. The alignment receptacles 166 defined within the rear wall 12 of the tub 14 can include a mating geometry 184 that can extend within this retaining region 180 and between the retaining tabs 182. In certain embodiments, the mating geometry 184 can extend around the retaining tabs 182 to secure the integral alignment features 162 within the alignment receptacles 166. The alignment features 162 and corresponding alignment receptacles 166 are oriented within the reinforcing cap 10 and the rear wall 12, respectively, to properly align the various utility fixtures 160 defined within the reinforcing cap 10 with the corresponding utilities 186 defined within the rear wall 12 of the tub 14.

The reinforcing cap 10 can include one or more engaging ribs 190 that extend outward, and typically perpendicularly, from the engaging surface 192 of the reinforcing cap 10. This engaging surface 192 of the reinforcing cap 10 is adapted to engage the back surface 70 of the rear wall 12 of the tub 14 at the various support ribs 26 defined within the rear wall 12. Where the reinforcing cap 10 is welded to the rear wall 12 of the tub 14, the engaging ribs 190 of the reinforcing cap 10 can be welded onto predefined locations within the rear wall 12 of the tub 14. These predefined locations can include the support ribs 26 and/or the circumferential ribs 194 (shown in FIG. 2) that extend concentrically around the rear wall 12 of the tub 14. These circumferential ribs 194 can correspond to the inner and outer support portions 72, 74 of the rear wall 12 of the tub 14.

As exemplified in FIGS. 7-9, the reinforcing cap 10 can include several utility fixtures 160 that are integrally defined within the structure of the reinforcing cap 10. At least one of these utility fixtures 160 can include integrally one or more formed wiring pockets 210 that receive wiring and/or wire harnesses that are connected with or are run to various portions of the motor 28 and the electrical system for the appliance 16, or other electric systems defined within the appliance 16. The wiring pocket 210 can also include space for fluid piping, and air conduits that may be necessary for fluidly delivering resources to various portions of the appliance 16.

The alignment features 162 of the reinforcing cap 10 serve to engage the alignment receptacles 166, such that each wiring pocket 210 is properly aligned with portions of the motor 28. In this manner, bending and crimping of the wiring that is delivered to the motor 28 can be kept to a minimum. Through the alignment of the reinforcing cap 10 with the rear wall 12 of the tub 14 by engagement of the alignment features 162 with the alignment receptacles 166, installation of the various utilities 186 of the appliance 16 can be done in an efficient manner that minimizes damage to the utilities 186 during manufacture of the appliance 16. Efficient wiring paths can also be provided through the wiring pockets 210 that may minimize the length of wire, and/or tubing that may be used in the appliance 16.

In order to make the installation of wiring of the appliance electrical system more efficient, the wiring pockets 210 defined within the reinforcing cap 10 can also include retaining features 264 that allow for positioning of wiring and wire harnesses through the reinforcing cap 10 and to portions of the motor 28. When the reinforcing cap 10 is disposed on the rear wall 12 of the tub 14, wiring from the motor 28 can be extended to the engaging surface 192 of the reinforcing cap 10 proximate the wiring pockets 210. An electrical connector 212 can be disposed within the wiring pockets 210 such that the wiring and wire harnesses can be easily engaged with the connector for final installation of the electrical wiring for the appliance 16. In various embodiments, the integral wiring pockets 210 can define a portion of the integral alignment features 162 that serve to rotationally align the reinforcing cap 10 with respect to the rear wall 12 of the tub 14. In such an embodiment, the wiring pockets 210 can cooperate with the integral alignment features 162 to properly locate the reinforcing cap 10 with respect to the rear wall 12 of the tub 14.

Figure 10:
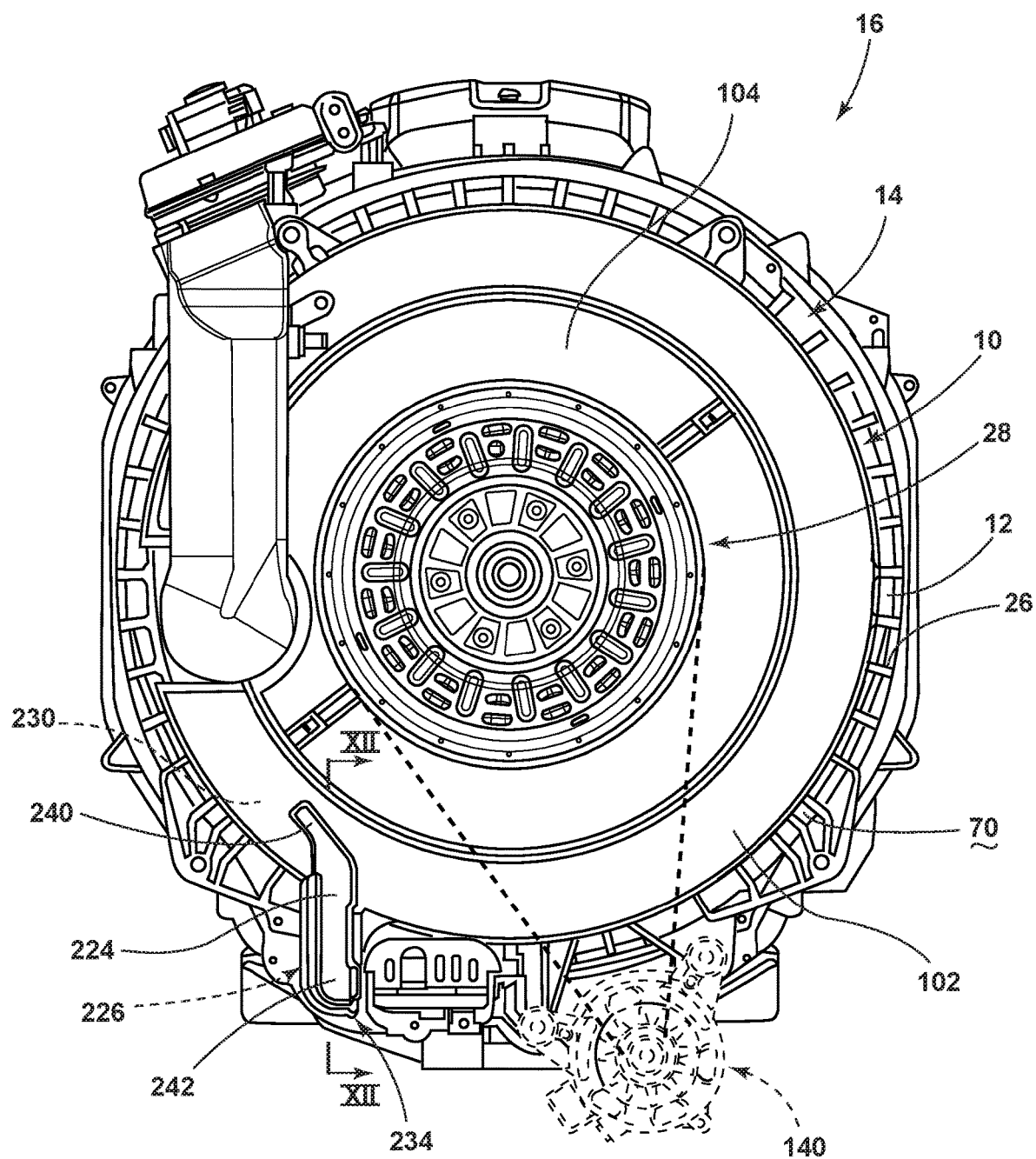
FIG. 10 is a rear elevational view of a tub for a laundry appliance and incorporating an aspect of a reinforcing cap that at least partially defines an integrated air trap for the appliance.
Figure 11:
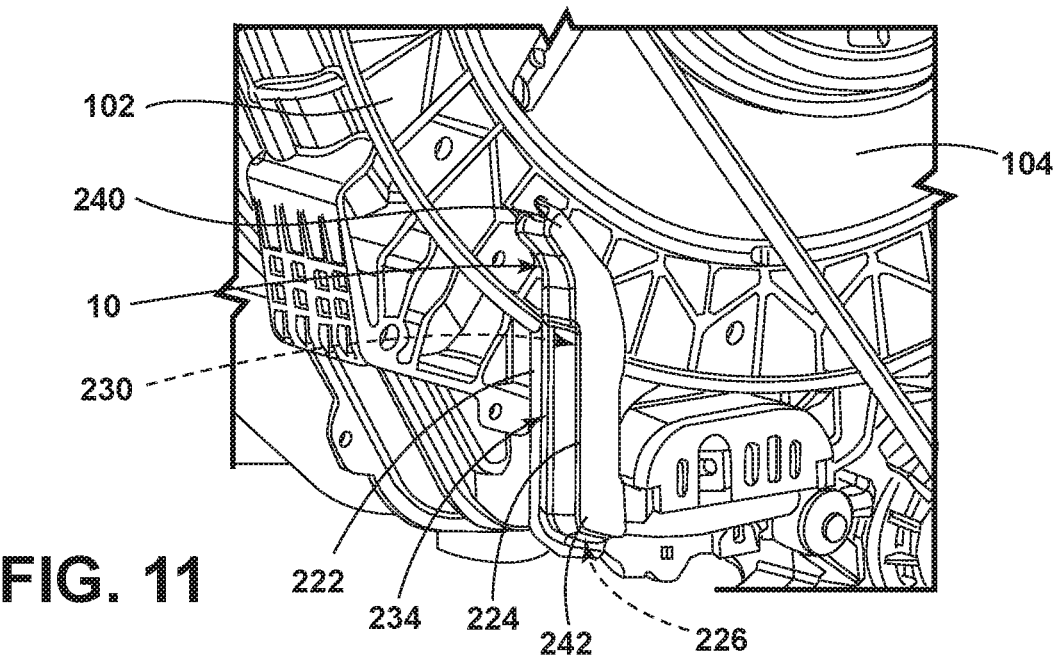
FIG. 11 is an enlarged perspective view of the appliance of FIG. 10 illustrating the reinforcing cap that defines the air trap.
Figure 12:
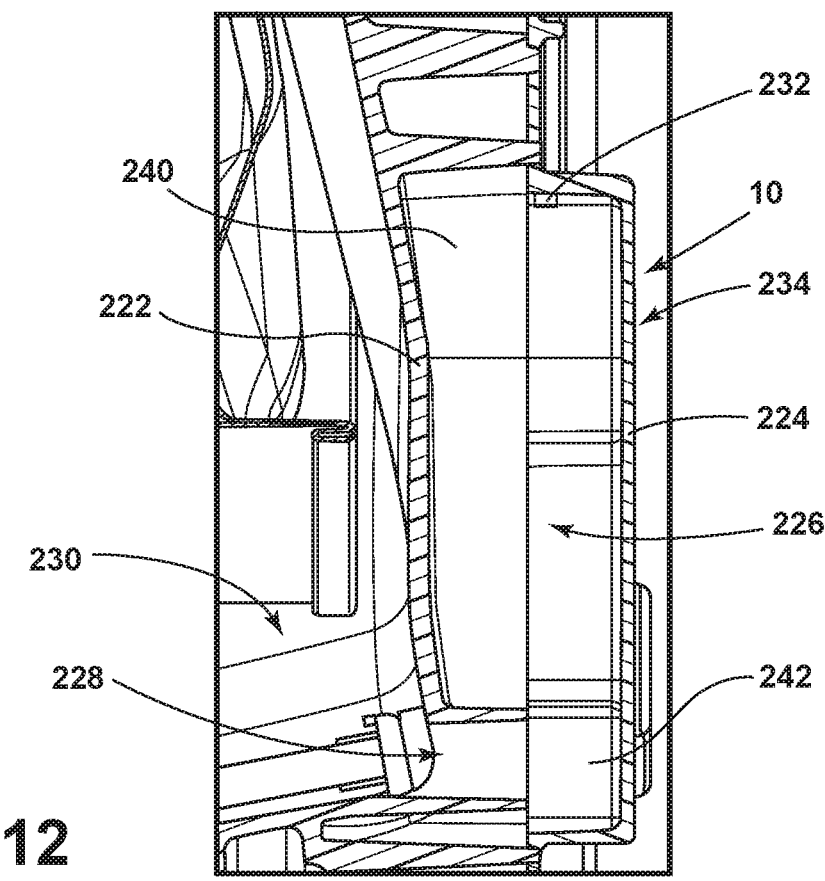
FIG. 12 is a cross-sectional view of the appliance of FIG. 10 taken along line XII-XII.

Referring now to FIGS. 10-12, the engagement of the reinforcing cap 10 with the rear wall 12 of the tub 14 can define various support cavities 60 and air spaces between these components. Such air spaces can be defined between the support ribs 26 defined within the back wall of the tub 14. One such air space can include a back wall recess 222 that may at least partially extend into an area between the support ribs 26 of the rear wall 12 of the tub 14. This back wall recess 222 can cooperate with a recessed portion 224 of the reinforcing cap 10 to define an enclosed airspace 226. This enclosed airspace 226 can include a single pressure aperture 228 that extends into an interior volume 230 of the tub 14. As the tub 14 fills with fluid, a portion of the fluid is adapted to enter the pressure aperture 228 of the enclosed air space. As more fluid is disposed within the tub 14, greater amounts of pressure are exerted through the pressure aperture 228 of the enclosed airspace 226. These changes in air pressure within the enclosed airspace 226 as a result of increased amounts of fluid within the tub 14, are measured by one or more pressure sensors 232 that monitor variations of the air pressure within the enclosed air space. In this manner, changes in the air pressure correspond to changes in the volume of fluid contained within the interior volume 230 of the tub 14. Accordingly, the enclosed air space defines an integral air trap 234 that is defined between an airtight engagement between the engaging surface 192 of the reinforcing cap 10 and the back surface 70 of the support ribs 26 for the rear wall 12 of the tub 14.

As exemplified in FIGS. 10-12, an upper portion 240 of the enclosed airspace 226 can be defined between the support ribs 26 of the rear wall 12 of the tub 14. A lower portion 242 of the enclosed airspace 226 may extend outward of these ribs such that the back wall recess 222 can be defined by a portion of the rear wall 12 of the tub 14 that extends outside of the support ribs 26. Similarly, the reinforcing cap 10 can include a portion that is contained within the circular perimeter 164 of the reinforcing cap 10. The recessed portion 224 of the reinforcing cap 10 can also extend outward of this perimeter 164 and match or substantially match the shape of the back wall recess 222 to define the airtight enclosed airspace 226 that defines the integral air trap 234 for the appliance 16.

The lower portion 242 of the integral air trap 234 can include the pressure aperture 228 through which fluid can enter into the enclosed airspace 226. Because the upper portion 240 of the enclosed airspace 226 above the pressure aperture 228 is airtight, air is trapped in this space. Accordingly, as fluid fills the tub 14, the back pressure of this fluid through the pressure aperture 228 becomes greater as more water is disposed in the tub 14. This greater pressure at the pressure aperture 228 exerts a back pressure against the air trapped within the upper portion 240 of the enclosed airspace 226. The pressure sensor 232 contained within the enclosed airspace 226 monitors this change in pressure to determine the amount of fluid within the tub 14.

By enclosing the integral air trap 234 between the reinforcing cap 10 and the rear wall 12 of the tub 14, additional exterior connections for mechanisms can be eliminated that may result in leaking from the appliance 16. Because the reinforcing cap 10 is welded to the rear wall 12 of the tub 14, the enclosed airspace 226 can be completely sealed except for the pressure aperture 228 that allows fluid from the tub 14 to enter into, or at least apply pressure to, the air within the integral air trap 234.

Figure 13:
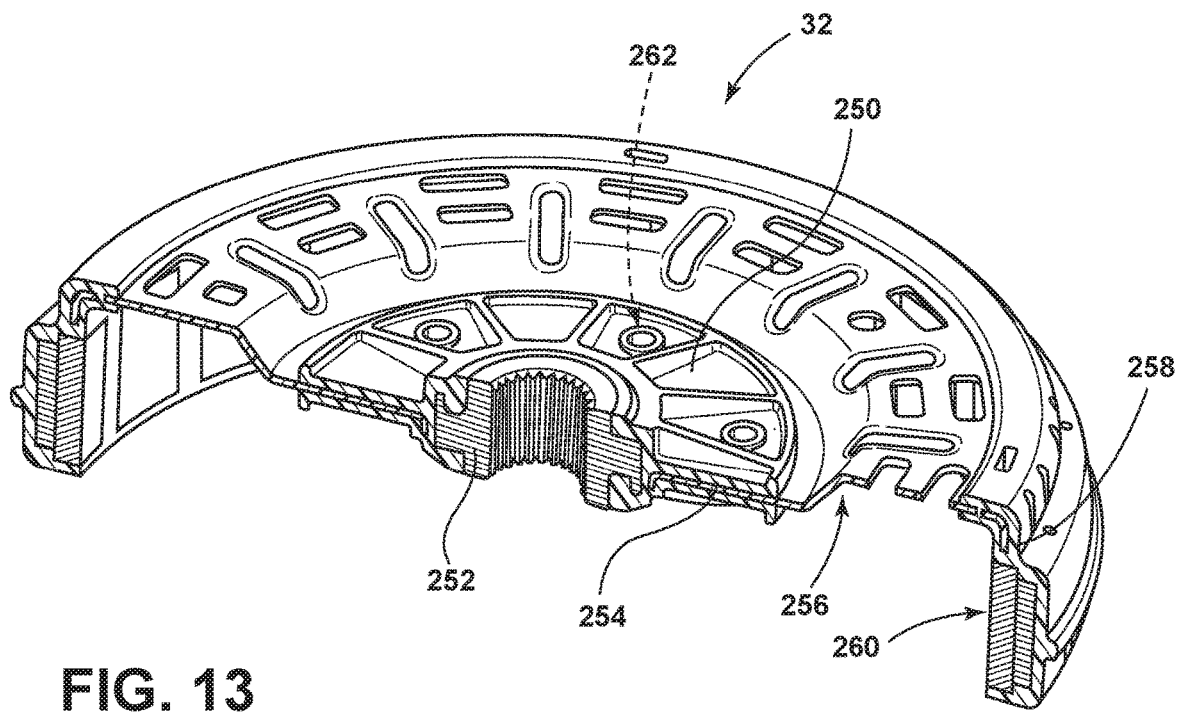
FIG. 13 is a cross-sectional view of an aspect of a rotor for an electric motor for a laundry appliance.
Figure 14:
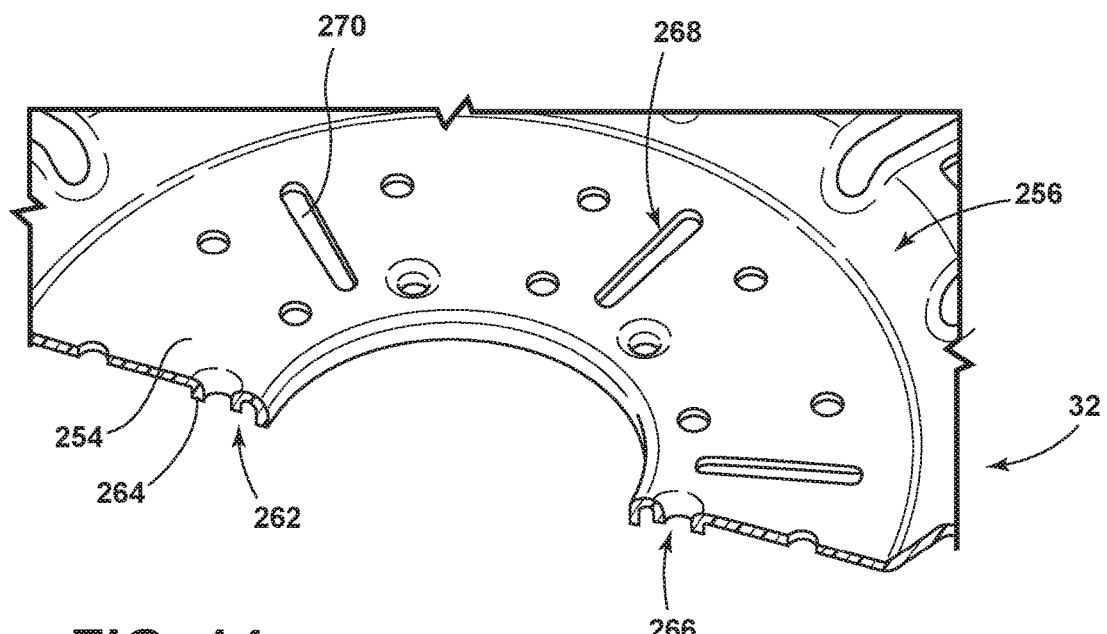
FIG. 14 is an enlarged cross-sectional view of the rotor of FIG. 13 and showing a metal plate with the metallic hub and inner plastic portion removed.

Referring now to FIGS. 13 and 14, the rotor 32 for the motor 28 of the appliance 16 can be made of various materials. The rotor 32 can include an inner plastic overmold 250 that connects an inner metal rotor hub 252 to an inner region 254 of a metal plate 256. The metal plate 256 is adapted to extend outward to an outer plastic overmold 258. This outer plastic overmold 258 is adapted to retain magnetic components 260 of the rotor 32 such that the outer plastic overmold 258 is at least partially molded around these magnetic components 260. The inner plastic overmold 250 is adapted to engage three-dimensional features 262 that are defined within the metal plate 256. In this manner, the material of the inner plastic overmold 250 forms around and within the three-dimensional features 262 to increase the connection strength between the metal plate 256 and the inner plastic overmold 250. This increased strength serves to resist slipping between the metal plate 256 and the inner plastic overmold 250 during operation of the appliance 16.

These three-dimensional features 262 extend at an angle or perpendicularly from the inner region 254 of the metal plate 256. These three-dimensional features 262 can include extruded holes 266, angled flaps, combinations thereof, and other similar geometric projections that can be defined as part of the inner region 254 of the metal plate 256. According to the various embodiments, these three-dimensional features 262 may take the form of cylindrical retaining features 264 that are oriented substantially perpendicular to the metal plate 256. These retaining features 264 serve to improve the torque transmission between the inner plastic overmold 250 and the inner region 254 of the metal plate 256. Additionally, these retaining features 264 serve to provide an additional connection support between the metal plate 256 and the metallic rotor hub 252 disposed at the center of the rotor 32.

It is also contemplated that the three-dimensional features 262 can take the form of punched slots 268 where a portion of the slot can be bent away from the metal plate 256 to form a retaining flange 270. This retaining flange 270, similar to the cylindrical retaining feature, serves to add structural support to the connection between the inner plastic overmold 250 and the inner region 254 of the metal plate 256.

The three-dimensional retaining features 264 of the metal plate 256 for the rotor 32 can include various features that can include, but are not limited to, punched holes, extruded holes 266, bent flaps, extruded slots, crimped portions, combinations thereof, and other similar three-dimensional features 262 defined within an inner region 254 of the metal plate 256 that engage the inner plastic overmold 250. Similar three-dimensional features 262 can also be included in the engagement between the metal plate 256 and the outer plastic overmold 258 to increase the connection strength at this location of the rotor 32 as well.

The material of the metallic plate can be steel, aluminum, alloys thereof, combinations thereof, and other similar metallic materials. The inner and outer plastic overmolds 250, 258 can include, but are not limited to, plastic, resin, polymers, composite-type materials, combinations thereof, and other similar formable materials.

The inner plastic overmold 250 and the outer plastic overmold 258 can be made of separate polymeric materials. The stresses experienced by the inner plastic overmold 250 near the rotor hub 252 can be higher than those experienced by the outer plastic overmold 258 where the rotor 32 is in magnetic communication with the stator 30. As such, a highly-rigid polymeric material may be used to form the outer plastic overmold 258. The use of this highly rigid polymeric material can serve to mitigate noise generation during use of the motor 28 of the appliance 16. Such a rigid polymeric material for use in the outer plastic overmold 258 can include, but is not limited to, a bulk molding compound (BMC) and other similar highly rigid polymers. Alternatively, it is contemplated that a different polymer can be used to form the inner plastic overmold 250 that engages the rotor hub 252. At this location of the rotor 32, cyclic high stresses can occur in the inner plastic overmold 250 with less sound issues being present. As such, the inner plastic overmold 250 can be made of various plastic materials that can include, but are not limited to, glass-filled polybutylene terephthalate (PBT), polypropylene, nylon, combinations thereof, and other similar high-performance polymers.

Figure 15:
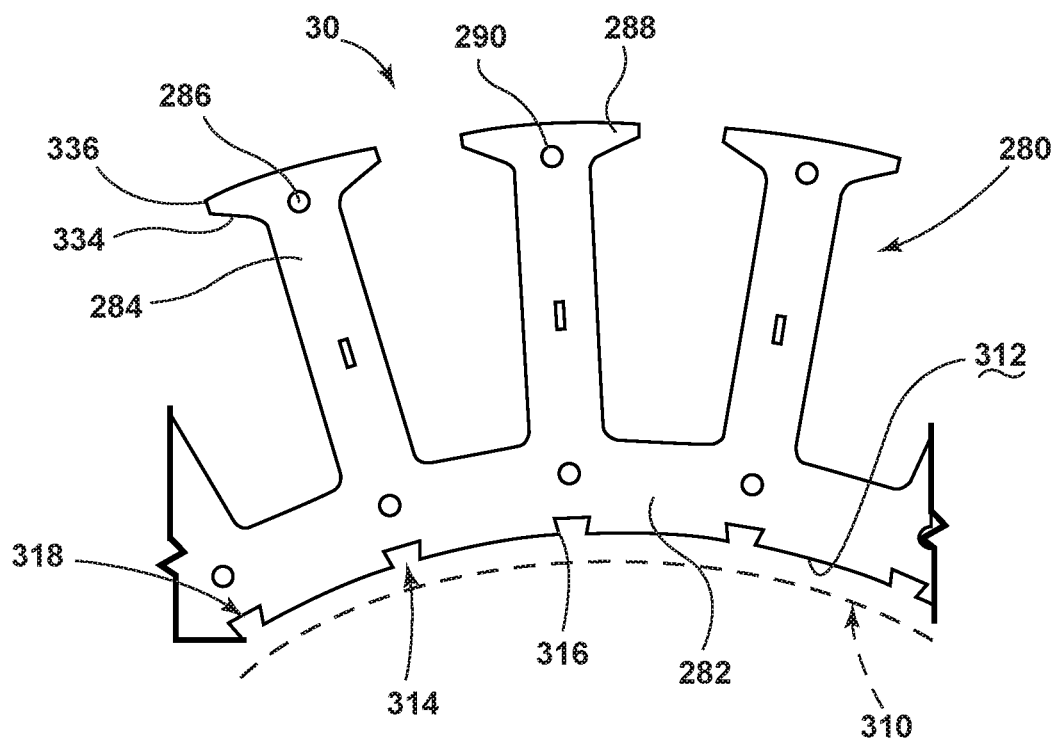
FIG. 15 is a top plan view of a portion of a stator core for an electric motor of a laundry appliance.
Figure 16:
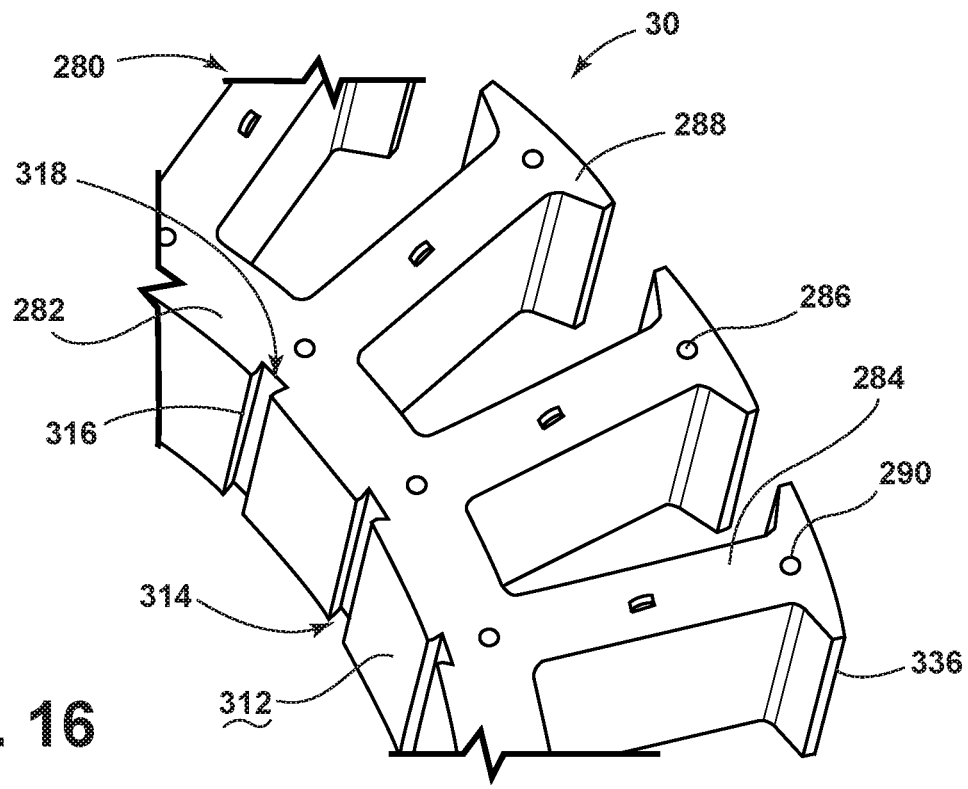
FIG. 16 is a top perspective view of the stator core of FIG. 15.

As exemplified in FIGS. 15 and 16, the stator 30 for the rotor 32 of the appliance 16 can include a stator core 280 that can be made of various segments, laminations, a coiled helical plate, stacked plates, and other similar configurations of metallic material. When the stator core 280 is formed, the stator core 280 includes an inner core 282 of the stator 30 and a plurality of teeth 284 that extend outwardly from the inner core 282. Where the stator core 280 is made from a helically wound plate or stacked laminations, rivets 286 can be positioned at or near the ends 288 of each of the teeth 284 of the stator core 280. These rivets 286 serve to secure the ends 288 of each of the teeth 284 to prevent unwanted vibration at the ends 288 of the teeth 284. The rivets 286 may be installed by pre-punching rivet holes 290 towards the ends 288 of each of the teeth 284 either before or after the stator 30 is constructed. Metallic rivets 286 can then be extended through the rivet holes 290 to secure the ends 288 of the teeth 284. The use of rivets 286 serve to minimize noise and vibration within the teeth 284 of the stator 30 that make up the teeth 284. The rivets 286 can also be installed after the stator core 280 is substantially formed by forming the rivet holes 290 in the teeth 284.

Figure 17:
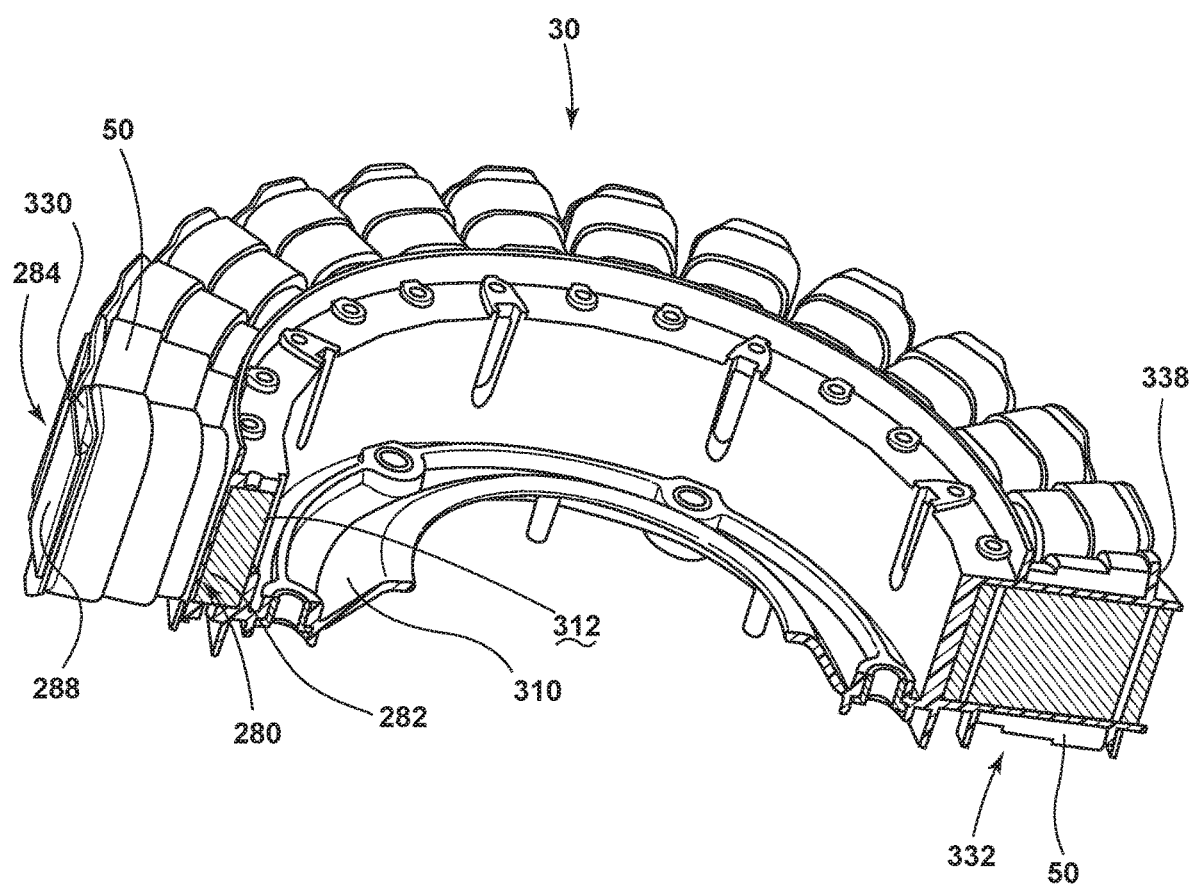
FIG. 17 is a cross-sectional perspective view of a stator for an electric motor of a laundry appliance.
Figure 18:
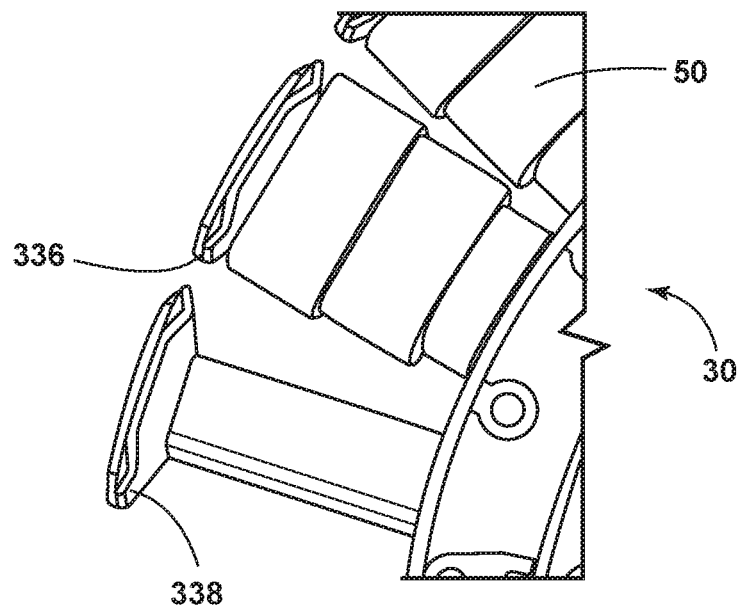
FIG. 18 is a top plan view of the teeth and windings of the stator of FIG. 17 and showing the windings removed from one of the teeth.
Figure 19:
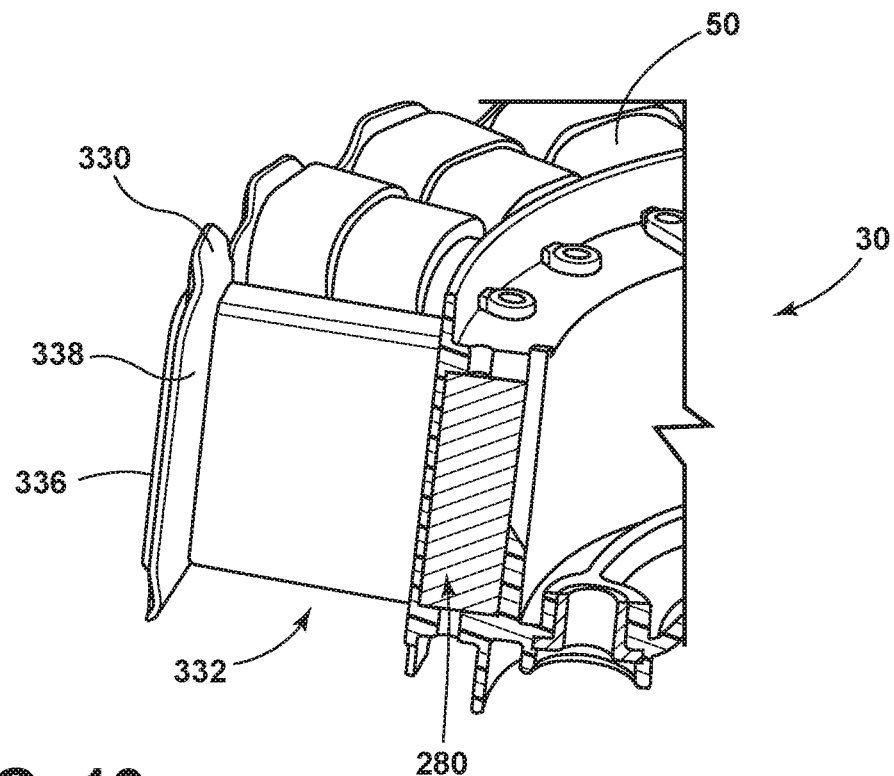
FIG. 19 is a cross-sectional perspective view of the stator of FIG. 18.

As exemplified in FIGS. 15-17, after the stator core 280 is formed, a plastic insulating material 310 is formed or molded, typically injection molded, around at least a portion of the stator core 280 to encase the stator core 280 within the insulating material 310. To retain the insulating material 310 against the stator core 280, the inside circumferential surface 312 of the stator core 280 can include a plurality of recesses 314 that serve to hold at least a portion of the plastic insulating material 310 therein. Each of these recesses 314 can include a narrowed opening 316 that opens into a wider inner recess 318 that receives a portion of the plastic insulating material 310. As the plastic insulating material 310 hardens, dries or cures, a portion of the plastic insulating material 310 is retained within the recesses 314. These recesses 314 can take the form of a dovetail, or other similar configuration that includes a narrowed opening 316. This narrowed opening 316 and wider inner recess 318 hold at least a portion of the plastic insulating material 310 therein and prevents the plastic insulating material 310 from pulling away from the inside circumferential surface 312 of the stator core 280. Accordingly, the recesses 314 serve to prevent the plastic insulating material 310 from pulling away and forming gaps at the inside circumferential surface 312 of the stator core 280. These recesses 314 can take various forms. Such forms can include arcuate shapes, angled shapes, polygonal recesses 314, and other similar shapes that include the narrowed opening 316 and the enlarged inner recess 318 for holding the plastic insulating material 310 therein.

As exemplified in FIG. 17, the plastic insulating material 310 that is molded around the stator core 280 surrounds the teeth 284 and the ends 288 of the teeth 284 for the stator core 280. At the ends 288 of the teeth 284, the plastic insulating material 310 can define a flared portion 330 that tapers away from the inner core 282 of the stator core 280 to provide a larger winding space 332 for including additional windings 50 around the various teeth 284 of the stator core 280. The increased number of windings 50 provides additional magnetic force for rotating the rotor 32 around the stator core 280 when the windings 50 are energized by an electrical current. These flared portions 330 serve to extend laterally between the various teeth 284 and also extend vertically above and below the teeth 284. Each of these flared portions 330 includes an angled surface 334 that extends away from the inner core 282 and increases the winding space 332. In this manner, an additional number of windings 50 can be included around each of the teeth 284.

The flared portions 330 between the teeth 284 may be defined by the shape of the ends 288 of the teeth 284 for the stator core 280. Accordingly, these flared portions 330 are defined by the shape of the ends 288 of the teeth 284 and may not include any additional material that extends outward and into an area between the teeth 284 of the stator core 280. The flared portions 330 that extend vertically above and below the ends 288 of the teeth 284 can be made of the plastic insulating material 310 that is formed around the ends 288 of the teeth 284 to include the flared shape that allows for an increase in the number of windings 50 around each of the teeth 284. The plastic insulating material 310 may form additional extensions 338 that project from a portion of the sides 336 of the teeth 284. These extensions 338 typically extend around substantially the outer edges of the head of the teeth 284.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A laundry appliance comprising:
   a tub having a rear wall that includes a plurality of structural ribs;
   a drive hub having a bearing housing insert injection molded into the rear wall, wherein radial ribs of the plurality of structural ribs radiate outward from the drive hub;
   a stator that is attached to the drive hub at stator fastening portions exposed through the rear wall of the tub;
   a reinforcing cap having outer and inner reinforcing portions that are parallel with one another and are fixed at least to the radial ribs, the reinforcing cap having an angled reinforcing portion extending between the outer and inner reinforcing portions;
wherein the bearing housing of the drive hub extends rearwards through a portion of the reinforcing cap;
the stator fastening portions are exposed through the reinforcing cap;
the angled reinforcing portion is spaced apart from the radial ribs to define a clearance space therebetween.

2. The laundry appliance of claim 1, wherein the angled reinforcing portion is a frustoconical member that extends between the inner and outer reinforcing portions.

3. The laundry appliance of claim 1, wherein engagement between the reinforcing cap and the radial ribs forms a plurality of shear walls and at least one enclosed support cavity.

4. The laundry appliance of claim 1, wherein the reinforcing cap and the radial ribs cooperatively define an air trap within the rear wall of the tub, wherein the air trap includes an aperture that extends between an enclosed air space of the air trap and an interior volume of the tub.

5. The laundry appliance of claim 1, wherein the reinforcing cap is free of engagement with and spaced apart from the drive hub and the stator.

6. The laundry appliance of claim 1, wherein the reinforcing cap includes a wiring pocket that is integrally formed therein, the wiring pocket having an electrical connector that is configured to electrically connect the stator to an appliance electrical system.

7. The laundry appliance of claim 1, wherein the reinforcing cap includes an integral alignment feature that extends outward from a perimeter of the outer reinforcing portion, wherein the integral alignment feature engages an alignment receptacle defined within the rear wall of the tub.

8. The laundry appliance of claim 7, wherein engagement between the integral alignment feature and the alignment receptacle is an engagement that is free of welding.

9. The laundry appliance of claim 1, wherein the inner and outer reinforcing portions of the reinforcing cap are welded to a back surface of the radial ribs.

10. A tub for a laundry appliance, the tub comprising:
a rear wall having structural radial ribs that define a back surface of the rear wall;
a reinforcing cap having outer and inner reinforcing portions that are fixed to the back surface of the rear wall and an angled reinforcing portion that is spaced apart from the structural radial ribs; and
a drive hub that is insert injection molded into the rear wall; wherein
a stator fastening portion of the drive hub extends through an opening of the reinforcing cap; and
the reinforcing cap is spaced apart from the drive hub and the stator fastening portion.

11. The tub of claim 10, wherein the outer, inner and angled reinforcing portions are concentric with a central axis of the tub.

12. The tub of claim 11, wherein the outer and inner reinforcing portions are each positioned perpendicular to the central axis.

13. The tub of claim 12, wherein the angled reinforcing portion extends between the outer and inner reinforcing portions, and wherein the angled reinforcing portion is generally conical in shape.

14. The tub of claim 10, wherein the reinforcing cap and the structural radial ribs cooperatively define an air trap of the rear wall that is in communication with an interior volume of the tub, wherein the air trap includes an aperture that extends between an enclosed air space of the air trap and the interior volume of the tub.

15. The tub of claim 10, wherein the reinforcing cap includes an integral alignment feature that extends outward from a perimeter of the reinforcing cap, wherein the integral alignment feature engages an alignment receptacle defined within the rear wall of the tub in a surface to-surface engagement.

16. A tub for a laundry appliance, the tub comprising:
a rear wall that includes a plurality of structural radial ribs that extend to a back surface of the tub;
a reinforcing cap having a reinforcing portion that is attached to the plurality of structural radial ribs at the back surface and a frustoconical portion that is at least partially spaced apart from the plurality of structural radial ribs and the back surface; and
a drive hub that is insert injection molded into the rear wall, wherein:
a stator fastening portion of the drive hub extends through a portion of the reinforcing cap; and
the reinforcing cap is spaced part from the drive hub and the stator fastening portion.

17. The tub of claim 16, wherein the reinforcing portion includes outer and inner reinforcing portions that are connected by the frustoconical portion, wherein the outer and inner reinforcing portions are generally perpendicular to a central axis of the tub.

18. The tub of claim 16, wherein engagement between the reinforcing cap and the plurality of structural radial ribs forms a plurality of shear walls and at least one enclosed support cavity.

* * * * *